(12) United States Patent
Noguchi

(10) Patent No.: US 11,143,878 B2
(45) Date of Patent: Oct. 12, 2021

(54) DISPLAY DEVICE

(71) Applicant: SEIKO EPSON CORPORATION, Tokyo (JP)

(72) Inventor: Toshiyuki Noguchi, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 172 days.

(21) Appl. No.: 16/669,577

(22) Filed: Oct. 31, 2019

(65) Prior Publication Data
US 2020/0142211 A1 May 7, 2020

(30) Foreign Application Priority Data

Nov. 1, 2018 (JP) .............................. JP2018-206847

(51) Int. Cl.
*G02B 27/01* (2006.01)
*G02B 27/42* (2006.01)

(52) U.S. Cl.
CPC ...... *G02B 27/4211* (2013.01); *G02B 27/0172* (2013.01); *G02B 27/4216* (2013.01); *G02B 2027/0116* (2013.01); *G02B 2027/0174* (2013.01); *G02B 2027/0178* (2013.01)

(58) Field of Classification Search
CPC .............. G02B 27/017; G02B 27/0172; G02B 27/4211; G02B 27/4216; G02B 2027/0116; G02B 2027/0174; G02B 2027/0178
USPC ........................................................ 359/630
See application file for complete search history.

(56) References Cited

U.S. PATENT DOCUMENTS

| 5,742,262 A * | 4/1998 | Tabata | G02B 27/0081 345/8 |
|---|---|---|---|
| 8,451,443 B2 * | 5/2013 | Takizawa | G01J 3/0218 356/328 |
| 10,921,598 B2 * | 2/2021 | Suzuki | G02B 27/0172 |
| 2007/0109619 A1 * | 5/2007 | Eberl | G06F 3/013 359/17 |
| 2008/0225291 A1 * | 9/2008 | Konno | G01J 3/04 356/328 |

(Continued)

FOREIGN PATENT DOCUMENTS

| JP | 2007-011057 A | 1/2007 |
|---|---|---|
| JP | 2009-186794 A | 8/2009 |
| JP | 2016-085428 A | 5/2016 |

*Primary Examiner* — William R Alexander
(74) *Attorney, Agent, or Firm* — Oliff PLC

(57) ABSTRACT

The display device including a first diffraction optical element group, and a second diffraction optical element group, wherein the first diffraction optical element group is constituted by laminating a first diffraction optical element having a first interference pattern corresponding to a wavelength band of one or two of three colors of red, green, and blue of the image light, and a second diffraction optical element having a second interference pattern corresponding to a wavelength band of remaining colors of the three colors, and the second diffraction optical element group is constituted by laminating a third diffraction optical element having a third interference pattern corresponding to a wavelength band of one or two of three colors of red, green, and blue of the image light, and a fourth diffraction optical element having a fourth interference pattern corresponding to a wavelength band of remaining colors of the three colors.

9 Claims, 19 Drawing Sheets

(56) References Cited

U.S. PATENT DOCUMENTS

| | | | | |
|---|---|---|---|---|
| 2010/0188638 A1* | 7/2010 | Eberl | .................... | A61B 3/113 |
| | | | | 351/221 |
| 2012/0008092 A1* | 1/2012 | Eberl | ................. | G02B 27/0093 |
| | | | | 351/206 |
| 2015/0098061 A1* | 4/2015 | Eberl | ...................... | A61B 3/14 |
| | | | | 351/210 |
| 2015/0346490 A1* | 12/2015 | Tekolste | ............. | G02B 27/0101 |
| | | | | 349/11 |
| 2016/0103324 A1* | 4/2016 | Arakawa | .............. | G02B 26/101 |
| | | | | 345/690 |
| 2016/0345826 A1* | 12/2016 | Eberl | ................. | G02B 27/0093 |
| 2017/0293147 A1* | 10/2017 | Tremblay | ............ | G02B 26/0833 |
| 2018/0278924 A1* | 9/2018 | Schowengerdt | ... | G02B 27/0172 |
| 2020/0209629 A1* | 7/2020 | Suzuki | ................. | H04N 9/3173 |

\* cited by examiner

DISPLAY DEVICE

The present application is based on, and claims priority from JP Application Serial Number 2018-206847, filed Nov. 1, 2018, the disclosure of which is hereby incorporated by reference herein in its entirety.

BACKGROUND

1. Technical Field

The present disclosure relates to a display device.

2. Related Art

JP-A-2009-186794 discloses a display device that guides image light to an eye of an observer by using a light guiding optical system in which a hologram is applied to a surface of a light guiding plate. In this display device, as holograms, a first hologram having interference pattern corresponding to two of three colors of image light of red, blue, and green, and a second hologram having interference pattern of the remaining one color are used. The first hologram and the second hologram are disposed separated from each other via the light guide plate and the air layer. In this display device, the holograms do not have a power to refract light so that the first hologram and the second hologram do not particularly affect image light when disposed separated from each other.

It is also conceivable to use an optical system that combines a projection optical system and two holograms having positive power instead of the light guiding optical system described above. However, in this case, because holograms having positive power are disposed so as to be separated from each other, the projection position of the image light is shifted for each color, which leads to a problem that the quality of the image observed by the observer decreases.

SUMMARY

In order to solve the above-described problem, a display device according to a first aspect of the present disclosure is a display device that guides image light emitted from an image light generating device to a pupil of an observer, the display device including a first diffraction optical element group having positive power and configured to receive the image light, and a second diffraction optical element group having positive power and configured to diffract the image light diffracted by the first diffraction optical element group to form an exit pupil, wherein the first diffraction optical element group is constituted by laminating a first diffraction optical element having a first interference pattern corresponding to a wavelength band of one or two of three colors of red, green, and blue of the image light, and a second diffraction optical element having a second interference pattern corresponding to a wavelength band of remaining colors of the three colors, and the second diffraction optical element group is constituted by laminating a third diffraction optical element having a third interference pattern corresponding to a wavelength band of one or two of three colors of red, green, and blue of the image light, and a fourth diffraction optical element having a fourth interference pattern corresponding to a wavelength band of remaining colors of the three colors.

In the display device according to the first aspect, the first diffraction optical element may be located closer to an incident surface side of the image light than the second diffraction optical element in the first diffraction optical element group, the third diffraction optical element may be located closer to an incident surface side of the image light than the fourth diffraction optical element in the second diffraction optical element group, and the first interference pattern and the third interference pattern may at least correspond to a blue wavelength band.

In the display device according to the first aspect, the first diffraction optical element may be located closer to an incident surface side of the image light than the second diffraction optical element in the first diffraction optical element group, the third diffraction optical element may be located closer to an incident surface side of the image light than the fourth diffraction optical element in the second diffraction optical element group, and the first interference pattern and the third interference pattern may at least correspond to a wavelength band of the image light having a lowest transmittance in the first diffraction optical element and the third diffraction optical element.

In the display device according to the first aspect, the first diffraction optical element may be located closer to an incident surface side of the image light than the second diffraction optical element in the first diffraction optical element group, the third diffraction optical element may be located closer to an incident surface side of the image light than the fourth diffraction optical element in the second diffraction optical element group, and the first interference pattern and the third interference pattern may at least correspond to a wavelength band of the image light having a lowest optical intensity.

In the display device according to the first aspect, the first diffraction optical element may be located closer to an incident surface side of the image light than the second diffraction optical element in the first diffraction optical element group, the third diffraction optical element may be located closer to an incident surface side of the image light than the fourth diffraction optical element in the second diffraction optical element group, and the first interference pattern and the third interference pattern may at least correspond to a wavelength band of the image light that most affects a white balance in the image light.

In the display device according to the first aspect, the first diffraction optical element may be located closer to an incident surface side of the image light than the second diffraction optical element in the first diffraction optical element group, the third diffraction optical element may be located closer to an incident surface side of the image light than the fourth diffraction optical element in the second diffraction optical element group, a thickness of the first diffraction optical element may be thinner than a thickness of the second diffraction optical element, and a thickness of the third diffraction optical element may be thinner than a thickness of the fourth diffraction optical element.

In the display device according to the first aspect, the first diffraction optical element, the second diffraction optical element, the third diffraction optical element, and the fourth diffraction optical element may be constituted by a reflection-type volume hologram.

In the display device according to the first aspect, the first diffraction optical element group and the second diffraction optical element group may have a curved shape.

DESCRIPTION OF EXEMPLARY EMBODIMENTS

First Exemplary Embodiment

Exemplary embodiments of the present disclosure will be described below with reference to the accompanying drawings. Note that, in each of the drawings below, to make each of layers and each of members a recognizable size, each of the layers and each of the members are illustrated to be different from an actual scale and an actual angle.

Figure 1:
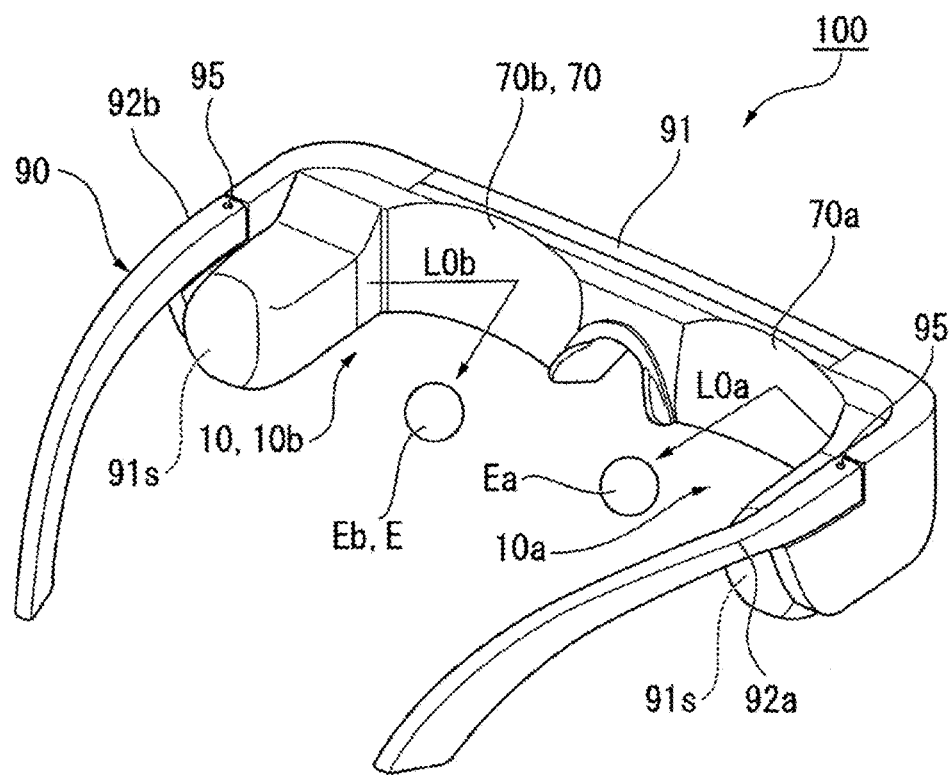
FIG. 1 is an external view illustrating one aspect of an external appearance of a display device according to a first exemplary embodiment.
Figure 1:
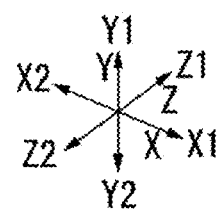
Figure 2:
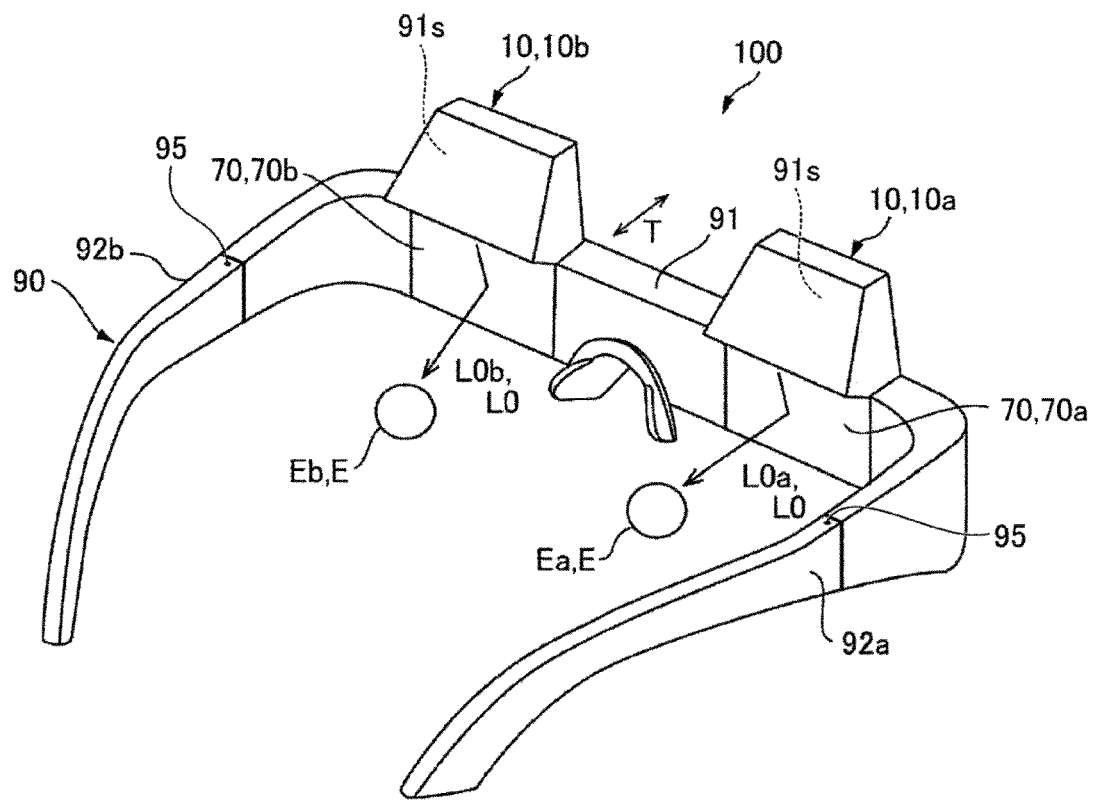
FIG. 2 is an external view illustrating one aspect of another external appearance of the display device.
Figure 3:
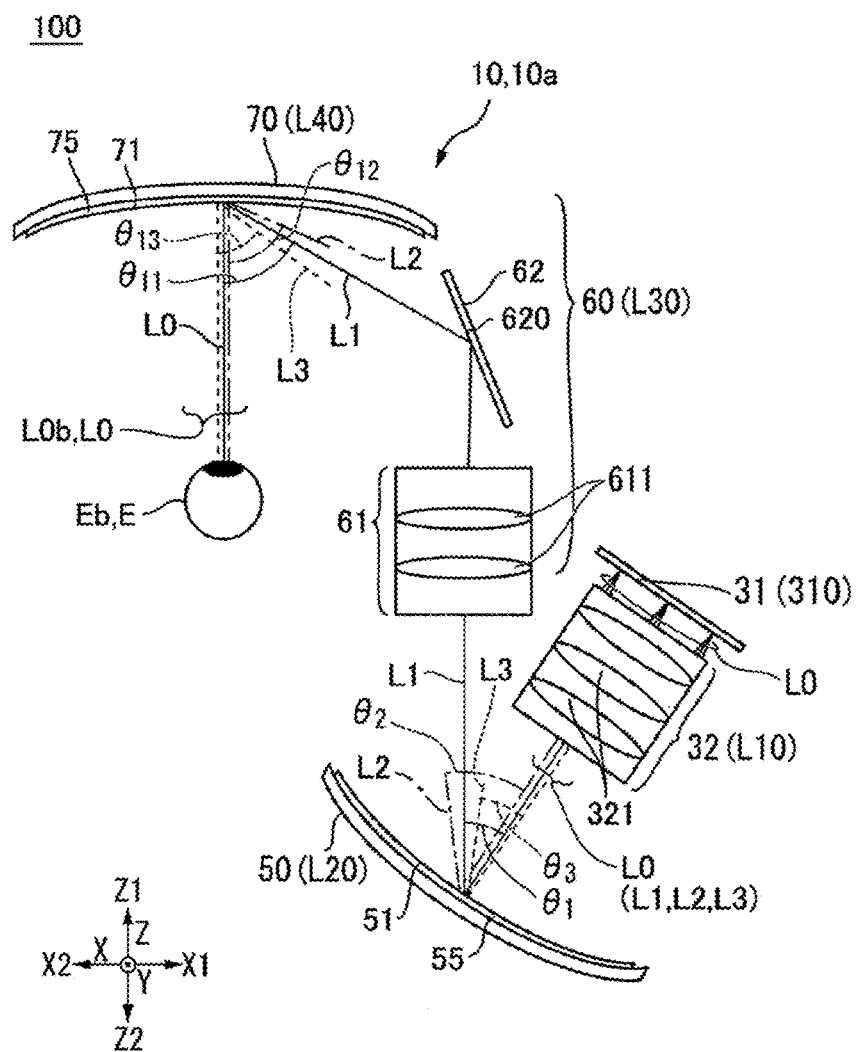
FIG. 3 is a schematic diagram illustrating one aspect of an optical system of the display device.

FIG. 1 is an external view illustrating one aspect of an external appearance of a display device 100 according to the present exemplary embodiment. FIG. 2 is an external view illustrating one aspect of another external appearance of the display device 100. FIG. 3 is a schematic diagram illustrating one aspect of an optical system 10 of the display device 100 illustrated in FIG. 1. Note that in FIGS. 1 to 3, the front and back direction of an observer wearing the display device is defined as a direction along the Z axis, the front side of the observer wearing the display device is defined as the front side Z1 as one side in the front and back direction, and the back side of the observer wearing the display device is defined as the back side Z2 as the other side in the front and back direction. The left and right direction of the observer wearing the display device is defined as a direction along the X axis, the right side of the observer wearing the display device is defined as the right side X1 as one side in the left and right direction, and the left side of the observer wearing the display device is the left side X2 as the other side in the left and right direction. The upper and lower direction of the observer wearing the display device is defined as a direction along the Y axis direction, the upper side of the observer wearing the display device is defined as the upper side Y1 as one side in the upper and lower direction, and the lower side of the observer wearing the display device is defined as the lower side Y2 as the other side in the upper and lower direction.

The display device 100 illustrated in FIG. 1 is a head-mounted display device, and includes a right-eye optical system 10a that causes image light L0a to be incident on a right eye Ea and the left-eye optical system 10b that causes image light L0b to be incident on a left eye Eb. For example, the display device 100 is formed in a shape like glasses. Specifically, the display device 100 further includes a housing 90 that holds the right-eye optical system 10a and the left-eye optical system 10b. The display device 100 is mounted on the head of the observer by the housing 90.

The display device 100 includes a frame 91, a temple 92a provided on the right side of the frame 91 and anchored to the right ear of the observer, and a temple 92b provided on the left side of the frame 91 and anchored to the left ear of the observer, as the housing 90. The frame 91 includes an accommodation spaces 91s on both sides, and each part of an image light projecting device or the like constituting the optical system 10 described below is housed in the accommodation space 91s. Each of the temple 92a and 92b is foldably coupled to the frame 91 by a hinge 95.

The right-eye optical system 10a and the left-eye optical system 10b have the same basic configuration. Therefore, the right-eye optical system 10a and the left-eye optical system 10b will be described as the optical system 10 without distinction in the description below.

In the display device 100 illustrated in FIG. 1, the image light L0 is advanced in the left and right direction along the X axis. However, as illustrated in FIG. 2, the image light L0 may be configured to advance from the upper side Y1 to the lower side Y2 and exit to the eye E of the observer, or the display device 100 may be configured so that the optical system 10 is disposed from the crown of the head to the front of the eye E.

A basic configuration of the optical system 10 of the display device 100 will be described with reference to FIG. 3. FIG. 3 is a schematic diagram illustrating one aspect of an optical system 10 of the display device 100 illustrated in FIG. 1. Note that, in addition to light L1 (solid line) of a specific wavelength of the image light L0, FIG. 3 also illustrates light L2 (dot-and-dash line) on a long wavelength side and light L3 (dotted line) on a short wavelength side with respect to the specific wavelength.

As illustrated in FIG. 3, in the optical system 10, a first optical unit L10 having positive power, a second optical unit L20 having positive power, a third optical unit L30 having positive power, and a fourth optical unit L40 having positive power are disposed along a direction of travel of the image light L0 emitted from the image light generating device 31.

In the present exemplary embodiment, the first optical unit L10 having positive power is constituted by a projection optical system 32. The second optical unit L20 having positive power is constituted by a first reflection-type diffraction optical element group 50. The third optical unit L30 having positive power is constituted by a light guiding system 60. The fourth optical unit L40 having positive power is constituted by a second reflection-type diffraction optical element group 70. In the present exemplary embodiment, the first diffraction optical element group 50 and the second diffraction optical element group 70 are reflection-type diffraction elements.

Focusing on the direction of travel of the image light L0 in the optical system 10, the image light generating device 31 emits the image light L0 toward the projection optical system 32, the projection optical system 32 emits the incident image light L0 toward the first diffraction optical element group 50, and the first diffraction optical element group 50 emits the incident image light L0 toward the light guiding system 60. The light guiding system 60 emits the incident image light L0 toward the second diffraction optical element group 70, and the second diffraction optical element group 70 emits the incident image light L0 toward the eye E of the observer.

In the present exemplary embodiment, the image light generating device 31 generates the image light L0.

An aspect may be adopted where the image light generating device 31 includes a display panel 310 such as an organic electroluminescent display element. The aspect can provide a small-sized display device 100 capable of displaying a high-quality image. Another aspect may be adopted where the image light generating device 31 includes an illumination light source (not illustrated) and a display panel 310 such as a liquid crystal display element that modulates illumination light emitted from the illumination light source. The aspect allows the illumination light source to be selected. Thus, the aspect has an advantage of increasing a degree of flexibility in a wavelength characteristic of the image light L0. Herein, an aspect may be adopted where the image light generating device 31 includes one display panel 310 that enables color display. Another aspect may be adopted where the image light generating device 31 includes a plurality of display panels 310 corresponding to respective colors and a synthesis optical system that synthesizes image light in respective colors emitted from the plurality of display panels 310. Furthermore, an aspect may be adopted where the image light generating device 31 modulates laser light by a micromirror device.

The projection optical system 32 is an optical system configured to project the image light L0 generated by the image light generating device 31, and is constituted by a plurality of lenses 321. In FIG. 3, an example is given of a case in which three lenses 321 are provided in the projection optical system 32, but the number of lenses 321 is not limited thereto, and the projection optical system 32 may include four or more lenses 321. Each of the lenses 321 may be adhered to form the projection optical system 32. The lens 321 may be constituted by a free curved lens.

The light guiding system 60 includes a lens system 61 on which the image light L0 emitted from the first diffraction optical element group 50 is incident and a mirror 62 that emits the image light L0 emitted from the lens system 61 in a direction inclined diagonally. The lens system 61 includes a plurality of lenses 611 disposed in the front and back direction along the Z axis. The mirror 62 includes a reflection surface 620 inclined diagonally toward the front and back direction. In the present exemplary embodiment, the mirror 62 is a total reflection mirror. However, the mirror 62 may be a half mirror, and in this case, the range in which the external light is visible can be widened.

Next, a configuration of the first diffraction optical element group 50 and the second diffraction optical element group 70 will be described.

In the present exemplary embodiment, the first diffraction optical element group 50 and the second diffraction optical element group 70 have the same basic configuration.

Figure 4:
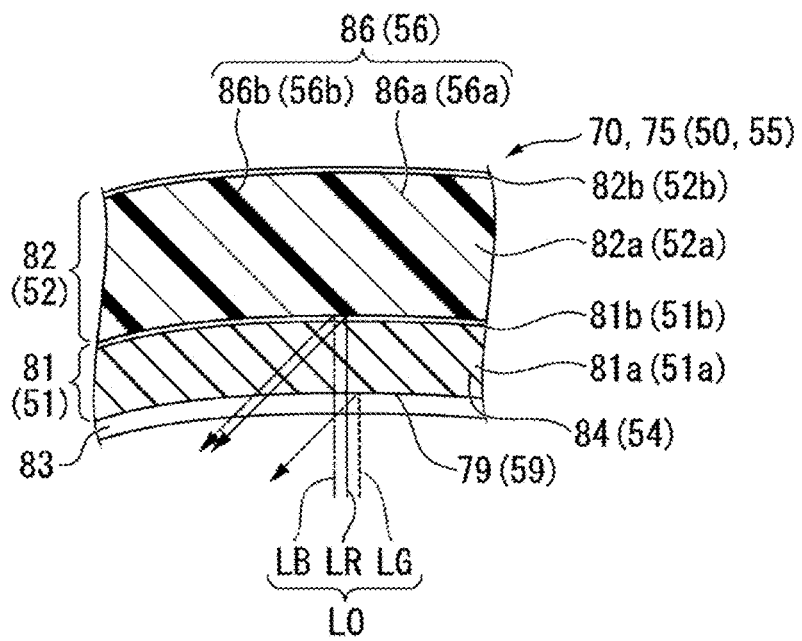
FIG. 4 is a diagram illustrating a configuration of a first diffraction optical element group and a second diffraction optical element group.

FIG. 4 is a diagram illustrating a configuration of the first diffraction optical element group 50 and the second diffraction optical element group 70. First, a configuration of the second diffraction optical element group 70 will be described.

As illustrated in FIG. 4, the second diffraction optical element group 70 includes a reflection-type volume hologram 75 that is a partial reflection-type diffraction optical element. Thus, the second diffraction optical element group 70 forms a partial transmissive reflective combiner. Since the second diffraction optical element group 70 of the present exemplary embodiment is constituted by the reflection-type volume hologram 75, light in the wavelength band that constitutes the image light can be selectively diffracted and have high light transmittance.

Therefore, external light is also incident on the eye E via the second diffraction optical element group 70, and thus the observer can recognize an image in which the image light L0 formed by the image light generating device 31 and the external light (background) are superimposed on each other at the same time.

The second diffraction optical element group 70 faces the eye E of the observer. The light incident surface 79 of the second diffraction optical element group 70 on which the image light L0 is incident has a concave surface being recessed in a direction away from the eye E. In other words, the light incident surface 79 has a shape having a central portion recessed and curved with respect to a peripheral portion in the incident direction of the image light L0. Thus, the second diffraction optical element group 70 has the equivalent function as the condensing lens, so the function of effectively condensing the image light L0 toward the eye of the observer can be enhanced. Therefore, a high-quality image having a great angle of view can be displayed.

In the present exemplary embodiment, the image light L0 emitted from the image light generating device 31 is for color display. Thus, the image light L0 includes red light LR, green light LG, and blue light LB. Red light LR is light in a red wavelength band, for example, from 580 nm to 700 nm, green light LG is light in a green wavelength band, for example, from 500 nm to 580 nm, and blue light LB is light in a blue wavelength band, for example, from 400 nm to 500 nm.

The second diffraction optical element group 70 is formed by laminating a third diffraction optical element 81 and a fourth diffraction optical element 82 on a base 83 made from a light-transmissive material. Here, laminating of the third diffraction optical element 81 and the fourth diffraction optical element 82 refers to a state in which other optical members such as a light guide plate are not positioned between the third diffraction optical element 81 and the fourth diffraction optical element 82. Note that the third diffraction optical element 81 and the fourth diffraction optical element 82 may be bonded, for example, via an adhesive. When an adhesive is used, laminating of the third diffraction optical element 81 and the fourth diffraction optical element 82 refers to a state in which other optical members such as a light guide plate are not positioned between the third diffraction optical element 81 and the fourth diffraction optical element 82 except the adhesive.

The second diffraction optical element group 70 includes the light incident surface 79 on which the image light L0 is incident, and the third diffraction optical element 81 is positioned closer to the light incident surface 79 side of the image light L0 than the fourth diffraction optical element 82. That is, the light incident surface 79 is constituted by a surface of the base 83.

The third diffraction optical element 81 includes a base material 81b and a diffraction portion 81a. The base material 81b is formed from, for example, PMMA, plastic such as a polycarbonate resin, an acrylic resin, an amorphous polypropylene resin, and a styrene resin including AS resin, or glass such as quartz or BK7, for example. Note that the base material 81b may include an adhesive that applies the third diffraction optical element 81 to the fourth diffraction optical element 82.

The diffraction portion 81a is constituted by, for example, a hologram photosensitive layer, and a third interference pattern 84 is formed from the interior to the surface. The third interference pattern 84 corresponds to a wavelength band of any two or fewer of three colors of red, green, and blue of the image light L0. Specifically, the third interference pattern 84 corresponds to green light LG, which is a green wavelength band. The third interference pattern 84 is formed at a pitch corresponding to a wavelength of 535 nm, for example, in a wavelength band from 500 nm to 580 nm.

The third interference pattern 84 is recorded as a difference in refractive index and the like in a hologram photosensitive layer. The third interference pattern 84 is inclined in one direction with respect to the light incident surface 79 of the second diffraction optical element group 70 so as to correspond to a specific incident angle. As a result, the third diffraction optical element 81 diffracts and deflects the green light LG of the image light L0 in a predetermined direction. The third interference pattern 84 can be formed by performing interference exposure on the holographic photosensitive layer by using reference light and object light. The third diffraction optical element 81 transmits the red light LR and blue light LB included in the image light L0 to the fourth diffraction optical element 82 side without diffraction.

The fourth diffraction optical element 82 includes a base material 82b and a diffraction portion 82a. In the present exemplary embodiment, the fourth diffraction optical element 82 contacts the third diffraction optical element 81. In other words, the base material 81b of the third diffraction optical element 81 and the diffraction portion 82a of the fourth diffraction optical element 82 are in contact.

In the present exemplary embodiment, the thickness of the third diffraction optical element 81 is thinner than the thickness of the fourth diffraction optical element 82.

The base material 82b is formed from a material similar to that of the base material 81b of the third diffraction optical element 81. The diffraction portion 82a is constituted by, for example, a hologram photosensitive layer, and a fourth interference pattern 86 is formed from the interior to the surface. The fourth interference pattern 86 corresponds to the red light LR and the blue light LB being the remaining two colors in the image light L0. The fourth interference pattern 86 is formed by overlapping interference pattern 86a formed, for example, at a pitch corresponding to the wavelength 615 nm in a wavelength band from 580 nm to 700 nm, and interference pattern 86b formed, for example, at a pitch corresponding to the wavelength 460 nm in a wavelength band from 400 nm to 500 nm.

The fourth interference pattern 86 is formed in a state where two interference patterns 86a and 86b are overlapped in one layer, for example, by dispersing photosensitive material having sensitivity corresponding to each wavelength of red and blue in a holographic photosensitive layer, and then performing interference exposure on the holographic photosensitive layer by using the reference light of each wavelength and object beam. The fourth diffraction optical element 82 diffracts and deflects the red light LR and blue light LB transmitted through the third diffraction optical element 81 in a predetermined direction by the fourth interference pattern 86, respectively.

Incidentally, in general, in holograms, the diffraction efficiency decreases as the number of wavelength ranges corresponding to the interference pattern increases. That is, when a hologram photosensitive layer corresponding to wavelength bands of three colors of red, green, and blue of the image light L0 is used, the diffraction efficiency of each color is low, and as a result, the brightness of the image light after diffraction will be reduced.

In contrast, according to the second diffraction optical element group 70 of the present exemplary embodiment, by dividing the reflection-type volume hologram into two layers, a structure in which each reflection-type volume hologram corresponds to a wavelength band of up to two colors is employed. Therefore, the reduction in brightness of the image light L0 after diffraction can be suppressed compared to a case where a structure corresponding to a wavelength band of three colors is used by a single layer of hologram as described above.

In the second diffraction optical element group 70 of the present exemplary embodiment, the thickness of the third diffraction optical element 81 is thinner than the thickness of the fourth diffraction optical element 82. In other words, the thickness of the third diffraction optical element 81 located on the light incident surface 79 side is thin, making it easier to suppress a reduction in brightness due to optical loss of the red light LR and blue light LB caused by transmission through the third diffraction optical element 81.

The second diffraction optical element group 70 of the present exemplary embodiment has positive power. In this case, when the third diffraction optical element 81 and the fourth diffraction optical element 82 are disposed separated from each other, there is a risk that the image quality observed by the observer may be reduced due to the projection position of the image light L0 being shifted from one color to another.

In contrast, in the second diffraction optical element group 70 of the present exemplary embodiment, the third diffraction optical element 81 and the fourth diffraction optical element 82 are formed by laminating. Thus, the third diffraction optical element 81 and the fourth diffraction optical element 82 are not separated from each other, and the occurrence of color shift in the image light L0 can be suppressed.

More specifically, in the second diffraction optical element group 70 of the present exemplary embodiment, the third diffraction optical element 81 having the third interference pattern 84 corresponding to the green light LG is provided on the light incident surface 79 side, so the green light LG does not transmit through the third diffraction optical element 81. Thus, it is possible to suppress the occurrence of optical loss due to absorption and the like of the green light LG by transmitting through the diffraction optical element. Since the green light LG has high visibility, the effect on image quality visible by the observer is large.

Therefore, according to the second diffraction optical element group 70 of the present exemplary embodiment, the green light LG with high luminous sensitivity can be efficiently diffracted and incident on the eye E of the observer, so the image quality observed by the observer can be improved.

The first diffraction optical element group 50 having the same basic configuration as that of the second diffraction optical element group 70 includes a reflection-type volume hologram 55. The light incident surface 59 of the first diffraction optical element group 50 on which the image light L0 is incident has a concave surface being recessed. In other words, the light incident surface 59 has a shape having a central portion recessed and curved with respect to a peripheral portion in the incident direction of the image light L0. Thus, the first diffraction optical element group 50 has the equivalent function as the condensing lens, so the image light L0 can be efficiently deflected toward the light-guiding system 60.

The first diffraction optical element group 50 is formed by laminating the first diffraction optical element 51 and the second diffraction optical element 52 on the base 93. The first diffraction optical element 51 and the second diffraction optical element 52 are bonded, for example, via an adhesive. Here, laminating of the first diffraction optical element 51 and the second diffraction optical element 52 refers to a state in which other optical members, such as a light guide plate, are not positioned between the first diffraction optical element 51 and the second diffraction optical element 52 except an adhesive.

The first diffraction optical element group 50 includes the light incident surface 59 on which the image light L0 is incident, and the first diffraction optical element 51 is positioned closer to the light incident surface 59 side than the second diffraction optical element 52. In other words, the light incident surface 59 is constituted by a surface of the first diffraction optical element 51.

The first diffraction optical element 51 includes a base material 51b and a diffraction portion 51a. Note that the base material 51b may include an adhesive that applies the first diffraction optical element 51 to the second diffraction optical element 52. A first interference pattern 54 is formed in the diffraction portion 51a. The first interference pattern 54 has a similar configuration to that of the third interference pattern 84. In other words, the first interference pattern 54 correspond to the green light LG, which is a green wavelength band, and is formed at a pitch corresponding to, for example, a wavelength of 535 nm.

The first diffraction optical element 51 diffracts and deflects the green light LG of the image light L0 in a predetermined direction. According to the first diffraction optical element 51 of the present exemplary embodiment, the image quality can be improved by efficiently diffracting the green light LG with high visibility, similar to the second diffraction optical element 52.

The first diffraction optical element 51 transmits the red light LR and blue light LB included in the image light L0 to the second diffraction optical element 52 side without diffraction. The second diffraction optical element 52 includes a base material 52b and a diffraction portion 52a. In the present exemplary embodiment, the second diffraction optical element 52 contacts the first diffraction optical element 51. The thickness of the first diffraction optical element 51 is thinner than the thickness of the second diffraction optical element 52.

A second interference pattern 56 is formed in the diffraction portion 52a. The second interference pattern 56 is formed by overlapping the interference pattern 56a and 56b corresponding to the red light LR and the blue light LB, respectively, which are the remaining two colors in the image light L0. The second interference pattern 56 can be manufactured in a similar manner as the third interference pattern 84.

The second diffraction optical element 52 diffracts and deflects the red light LR and the blue light LB transmitted through the first diffraction optical element 51 in a predetermined direction, respectively.

According to the first diffraction optical element group 50 of the present exemplary embodiment, the reduction in brightness of the image light L0 after diffraction can be suppressed by dividing the reflection-type volume hologram into two layers, similar to the second diffraction optical element group 70. According to the first diffraction optical element group 50 of the present exemplary embodiment, the first diffraction optical element 51 and the second diffraction optical element 52 are formed by laminating. Thus, the occurrence of color shift in the image light L0 can be suppressed. According to the first diffraction optical element group 50 of the present exemplary embodiment, the thickness of the first diffraction optical element 51 located on the light incident surface 59 side is thin, and therefore, a reduction in brightness in the image light L0 caused by transmission through the first diffraction optical element 51 is more easily suppressed.

Figure 5:
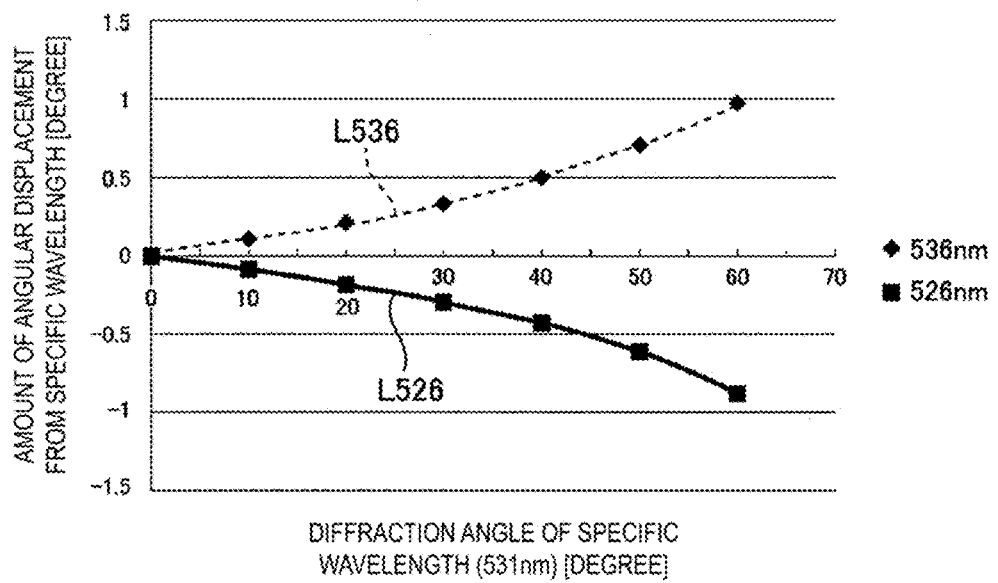
FIG. 5 is an explanatory diagram illustrating diffraction characteristics of the first and second diffraction optical element groups.

FIG. 5 is an explanatory diagram illustrating diffraction characteristics of the first diffraction optical element group 50 and the second diffraction optical element group 70 illustrated in FIG. 3. FIG. 5 illustrates the difference in diffraction angle between a specific wavelength and a peripheral wavelength when a light ray is incident on a single point on the volume hologram. In FIG. 5, when the specific wavelength is defined as 531 nm, the deviation in the diffraction angle of light at a peripheral wavelength of 526 nm is indicated by the solid line L526, and the deviation in the diffraction angle of light at a peripheral wavelength of 536 nm is indicated by the dotted line L536. As illustrated in FIG. 5, even in cases where light rays are incident on the same interference pattern recorded in the hologram, light rays having a long wavelength diffract greatly and light rays having a short wavelength are less likely to diffract. Therefore, when two diffraction elements, namely, the first diffraction optical element group 50 and the second diffraction optical element group 70 are used as in the present exemplary embodiment, the wavelength cannot be properly compensated for when light ray angles in light having a long wavelength and light having a short wavelength relative to a specific wavelength are not appropriately incident. That is, color aberrations generated in the second diffraction optical element group 70 cannot be canceled. Because the angle of diffraction varies depending on the number of interference patterns, interference pattern need to be considered.

In the optical system 10 illustrated in FIG. 3, as described in JP-A-2017-167181, since the incident direction and the like of the second diffraction optical element group 70 is made appropriate depending on the number of formations of intermediate images between the first diffraction optical element group 50 and the second diffraction optical element group 70, and whether the sum of the number of reflections of the mirror 62 is odd or even, wavelength compensation, i.e., color aberrations, can be canceled.

Specifically, as illustrated in FIG. 3, the image light L0 incident on the first diffraction optical element group 50 is deflected by diffracting by the first diffraction optical element group 50. At this time, the light L2 on the long wavelength side with respect to the specific wavelength has a diffraction angle $\theta_2$ greater than a diffraction angle $\theta_1$ of the light L1 having the specific wavelength. Further, the light L3 on the short wavelength side with respect to the specific wavelength has a diffraction angle $\theta_3$ smaller than a diffraction angle $\theta_1$ of the light L1 having the specific wavelength. Therefore, the image light L0 emitted from the first diffraction optical element group 50 is deflected and dispersed at each wavelength.

The image light L0 emitted from the first diffraction optical element group 50 is incident on the second diffraction optical element group 70 via the light-guiding system 60 and is then deflected by diffracting by the second diffraction optical element group 70. At this time, in the optical path from the first diffraction optical element group 50 to the second diffraction optical element group 70, an intermediate image is formed once, and reflection by the mirror 62 is performed once. Therefore, when assuming that an angle between the image light L0 and a normal line of the incident surface of the second diffraction optical element group 70 is an incident angle, the light L2 on the long wavelength side with respect to the specific wavelength has an incident angle $\theta_{12}$ greater than an incident angle $\theta_{11}$ in the light L1 having the specific wavelength while the light L3 on the short wavelength side with respect to the specific wavelength has an incident angle $\theta_{13}$ smaller than the incident angle $\theta_{11}$ in the light L1 having the specific wavelength. Further, as described above, the light L2 on the long wavelength side with respect to the specific wavelength has a diffraction angle $\theta_2$ greater than a diffraction angle $\theta_1$ of the light L1 having the specific wavelength. The light L3 on the short wavelength side with respect to the specific wavelength has a diffraction angle $\theta_3$ smaller than a diffraction angle $\theta_1$ of the light L1 having the specific wavelength.

Accordingly, the light L2 on the long wavelength side with respect to the specific wavelength is incident on the first diffraction optical element group 50 at an incident angle greater than an incident angle of the light L1 having the specific wavelength. However, the light L2 on the long wavelength side with respect to the specific wavelength has the diffraction angle greater than the diffraction angle of the light L1 having the specific wavelength. Thus, as a result, the light L2 on the long wavelength side with respect to the specific wavelength and the light L1 having the specific wavelength are substantially parallel light when being emitted from the second diffraction optical element group 70. In contrast, the light L3 on the short wavelength side with respect to the specific wavelength is incident on the first diffraction optical element group 50 at an incident angle smaller than an incident angle of the light L1 having the specific wavelength. However, the light L3 on the short wavelength side with respect to the specific wavelength has the diffraction angle smaller than the diffraction angle of the light L1 having the specific wavelength. Thus, as a result, the light L3 on the short wavelength side with respect to the specific wavelength and the light L1 having the specific wavelength are substantially parallel light when being emitted from the second diffraction optical element group 70. Accordingly, as illustrated in FIG. 3, since the image light L0 emitted from the second diffraction optical element group 70 is incident as the substantially parallel light on the eye E of the observer, misalignment of image formation in a retina E0 at each wavelength can be suppressed. Accordingly, color aberrations generated in the second diffraction optical element group 70 can be canceled.

Next, a conjugate relationship between the first diffraction optical element group 50 and the second diffraction optical element group 70 will be described.

Figure 6A:
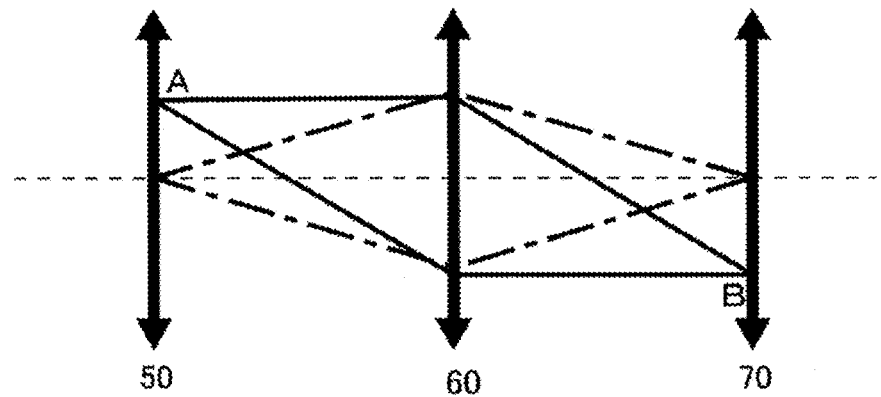
FIG. 6A is an explanatory diagram of a case where the first and second diffraction optical element groups are in a conjugate relationship.
Figure 6B:
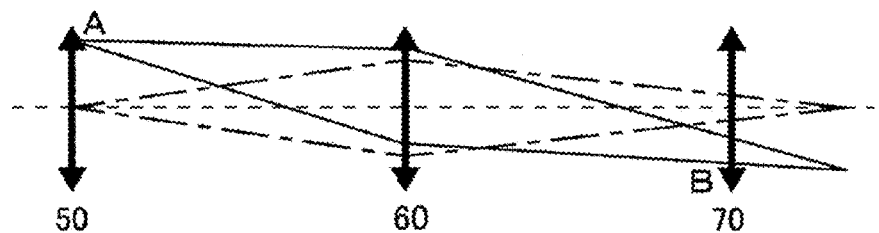
FIG. 6B is an explanatory diagram of a case where the first diffraction and the second diffraction optical element groups are not in a conjugate relationship.
Figure 6C:
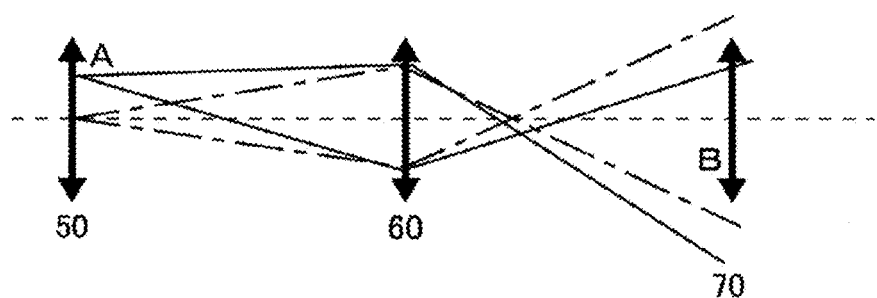
FIG. 6C is an explanatory diagram of a case where the first diffraction and the second diffraction optical element groups are not in a conjugate relationship.
Figure 7A:
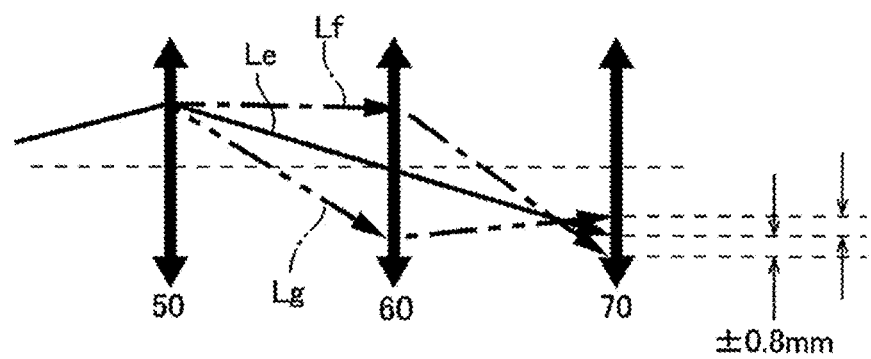
FIG. 7A is an explanatory diagram illustrating a tolerance for misalignment from a conjugate relationship of the first and second diffraction optical element groups.
Figure 7B:
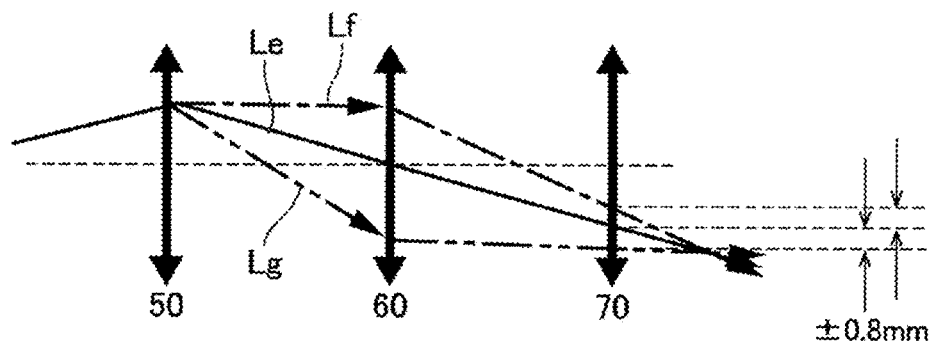
FIG. 7B is an explanatory diagram of another form illustrating a tolerance for misalignment from a conjugate relationship of the first and second diffraction optical element groups.

FIG. 6A is an explanatory diagram of a case where the first diffraction optical element group 50 and the second diffraction optical element group 70 are in a conjugate relationship. FIGS. 6B and 6C are explanatory diagrams of cases where the first diffraction optical element group 50 and the second diffraction optical element group 70 are not in a conjugate relationship. FIGS. 7A and 7B are explanatory diagrams illustrating tolerances of misalignment from the conjugate relationship of the first diffraction optical element group 50 and the second diffraction optical element group 70 illustrated in FIG. 6B and FIG. 6C. In FIG. 7A and FIG. 7B, light of a specific wavelength is indicated by a solid line Le, light having a wavelength of a specific wavelength −10 nm is indicated by a dot-and-dash line Lf, and light having a wavelength of a specific wavelength +10 nm is indicated by a two-dot chain line Lg. Note that in FIGS. 6A to 6C and FIG. 7A and FIG. 7B, the first diffraction optical element group 50, the second diffraction optical element group 70, and the light-guiding system 60 are illustrated as transmissive type, and the first diffraction optical element group 50, the second diffraction optical element group 70, and the light-guiding system 60 are indicated by arrows such that travel of light is easily understood.

As illustrated in FIG. 6A, when the first diffraction optical element group 50 and the second diffraction optical element group 70 are configured to be in a conjugate relationship, the diverging light emitted from the point A (first position) of the first diffraction optical element group 50 is condensed by the light guiding system 60 having positive power, and is incident on the point B of the second diffraction optical element group 70 (second position corresponding to the first position). Therefore, color aberrations due to diffraction generated at the point B can be compensated for at the point A.

In contrast, as illustrated in FIG. 6B and FIG. 6C, when the first diffraction optical element group 50 and the second diffraction optical element group 70 are not in a conjugate relationship, the diverging light emitted from the point A of the first diffraction optical element group 50 is condensed by the light guiding system 60 having a central positive power, but intersects and is incident at a position farther from or a position closer to the point B on the second diffraction optical element group 70. Therefore, the point A and the point B are not in a one-to-one relationship. Here, because the compensation effect is increased when the interference pattern in the region are uniform, when the first diffraction optical element group 50 and the second diffraction optical element group 70 are not in a conjugate relationship, the compensation effect is weak. On the other hand, it is difficult to compensate for the entire projection region of the second diffraction optical element group 70 by the first diffraction optical element group 50. Therefore, in the case of the aspects illustrated in FIG. 6B and FIG. 6C, degradation of resolution occurs because sufficient wavelength compensation cannot be performed.

Note that in light having a wavelength of ±10 nm for a specific wavelength, there is a ±0.4 mm degree error from the point B where light of the specific wavelength reaches, but the reduction in resolution is not noticeable. As a result of studying such an acceptable range, as illustrated in FIG. 7A, when light of a specific wavelength is incident in a range of +0.8 mm with intersecting before the ideal point B on the second diffraction optical element group 70 at which light of a specific wavelength reaches, the reduction in resolution is not noticeable. As illustrated in FIG. 7B, when light of a specific wavelength is incident in a range of +0.8 mm with intersecting behind the ideal point B on the second diffraction optical element group 70 where light of a specific wavelength reaches, the reduction in resolution is not noticeable. Accordingly, in the first diffraction optical element group 50 and the second diffraction optical element group 70, even if there is no full conjugate relationship, reduction in resolution can be tolerated when being in a substantially conjugate relationship and reaching within +0.8 mm ranges from the ideal point B. In other words, in the present exemplary embodiment, the first diffraction optical element group 50 and the second diffraction optical element group 70 have a conjugate relationship means that the incident position of light having a specific wavelength falls within ±0.8 mm error range from the ideal incident point.

Figure 8:
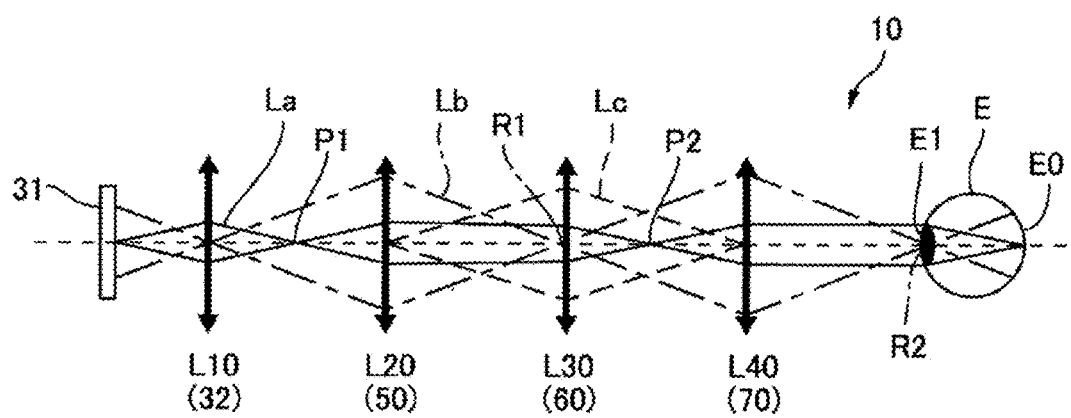
FIG. 8 is a light ray diagram of an optical system.

FIG. 8 is a light ray diagram of the optical system 10 of the present exemplary embodiment. In FIG. 8 and the figures referred to later, each optical unit disposed along the optical axis is indicated by a thick arrow. The light rays emitted from one pixel of the image light generating device 31 are indicated by the solid line La, the main light ray emitted from the end portion of the image light generating device 31 is indicated by the dot-dash line Lb, and the position in which the main light ray is brought into a conjugate relationship with the first diffraction optical element group 50 is indicated by the long dashed line Lc. Here, "intermediate image" refers to a position where light rays (solid lines La) emitted from one pixel converge, and "pupil" refers to a position where the main light rays (dot-dash line Lb) of each of the angles of image converge. FIG. 8 is a diagram illustrating the travel of light emitted from the image light generating device 31. Note that in FIG. 8, for the sake of simplicity, all optical units are illustrated as transmissive type.

As illustrated in FIG. 8, in the optical system 10 of the present exemplary embodiment, the optical system 10 includes a first optical unit L10 having positive power and the first diffraction optical element group 50 along the optical path of the image light emitted from the image light generating device 31, and a second optical unit L20 having positive power, a third optical unit L30 having positive power, and the second diffraction optical element group 70, and a fourth optical unit L40 having positive power are provided.

The focal length of the first optical unit L10 is L/2, and the focal lengths of the second optical unit L20, the third optical unit L30, and the fourth optical unit L40 are all L. Therefore, the optical distance from the second optical unit L20 to the third optical unit L30 is equal to the optical distance from the third optical unit L30 to the fourth optical unit L40.

In such an optical system 10, a first intermediate image P1 of the image light is formed between the first optical unit L10 and the third optical unit L30, a pupil R1 is formed between the second optical unit L20 and the fourth optical unit L40, a second intermediate image P2 of the image light is formed between the third optical unit L30 and the fourth optical unit L40, and the fourth optical unit L40 collimates the image light to form an exit pupil R2. At this time, the third optical unit L30 causes the image light emitted from the second optical unit L20 to enter the fourth optical unit L40 as divergent light. The second optical unit L20 allows the image light emitted from the first optical unit L10 to be freely controlled with divergent light or converging light or parallel light to enter the third optical unit L30. In the optical system 10 of the present exemplary embodiment, the pupil R1 is formed in the vicinity of the third optical unit L30 between the second optical unit L2 and the fourth optical unit L40. The vicinity of the third optical unit L30 refers to a position between the second optical unit L20 and the third optical unit L30 that is closer to the third optical unit L30 than the second optical unit L20, or between the third optical unit L30 and the fourth optical unit L40 that is closer to the third optical unit L30 than the fourth optical unit L40.

The third optical unit L30 causes the image light from one point of the image light generating device 31 to be deflected by the first diffraction optical element group 50 to cause light of a peripheral wavelength deviated from a specific wavelength to be incident on a predetermined range of the second diffraction optical element group 70. In other words, the first diffraction optical element group 50 and the second diffraction optical element group 70 are in a conjugate relationship or a substantially conjugate relationship. Here, the absolute value of the magnification of the projection on the second diffraction optical element group 70 by the third optical unit L30 of the first diffraction optical element group 50 is from 0.5 times to 10 times, and the absolute value of the magnification may be from 1 times to 5 times.

Accordingly, according to the optical system 10 of the present exemplary embodiment, the first intermediate image P1 of the image light is formed between the projection optical system 32 and the light guiding system 60, the pupil R1 is formed in the vicinity of the light guiding system 60, the second intermediate image P2 of the image light is formed between the light guiding system 60 and the second diffraction optical element group 70, and the second diffraction optical element group 70 collimates the image light to form the exit pupil R2.

In the optical system 10 of the present exemplary embodiment, the first intermediate image P1 is formed between the first optical unit L10 (projection optical system 32) and the second optical unit L20 (first diffraction optical element group 50).

According to the optical system 10 of the present exemplary embodiment, four conditions (Conditions 1, 2, 3, and 4) described below are satisfied.

Condition 1: the light rays emitted from one point of the image light generating device 31 are imaged to the retina E0 as a point.

Condition 2: the entrance pupil of the optical system and the pupil of the eye are conjugated.

Condition 3: the first diffraction optical element group 50 and the second diffraction optical element group 70 are appropriately disposed so as to compensate for the peripheral wavelength.

Condition 4: the first diffraction optical element group 50 and the second diffraction optical element group 70 are in a conjugated or substantially conjugate relationship.

More specifically, as can be seen from the solid line La illustrated in FIG. 8, a light ray emitted from one point of the image light generating device 31 satisfies Condition 1 of being imaged to the retina E0 as one point, so the observer can recognize one pixel. As can be seen from the solid line La illustrated in FIG. 8, Condition 2 is satisfied in which the entrance pupil of the optical system 10 and the pupil E1 of the eye E are conjugated (conjugation of the pupil), so the entire region of the image generated by the image light generating device 31 can be viewed. In order to satisfy Condition 3 in which the first diffraction optical element group 50 and the second diffraction optical element group 70 are appropriately disposed so as to compensate for the peripheral wavelength, color aberrations generated in the second diffraction optical element group 70 can be canceled by performing wavelength compensation. As can be seen from the long dashed line Lc illustrated in FIG. 8, Condition 4 is satisfied in which the first diffraction optical element group 50 and the second diffraction optical element group 70 are in a conjugated or substantially conjugate relationship, so the first diffraction optical element group 50 and the second diffraction optical element group 70 can cause the light rays to be incident on a position with the same interference pattern, and wavelength compensation can be performed appropriately. Thus, degradation of the resolution of the image light can be suppressed.

According to the optical system 10 of the present exemplary embodiment, the first diffraction optical element group 50 and the second diffraction optical element group 70 that efficiently diffract the green light LG having high luminous sensitivity are provided, so the image quality of the observed image for the observer can be improved.

According to the optical system 10 of the present exemplary embodiment, the first diffraction optical element group 50 and the second diffraction optical element group 70 configured by dividing the reflection-type volume hologram into two layers are provided, so the reduction in brightness of the image light L0 after diffraction can be suppressed.

According to the optical system 10 of the present exemplary embodiment, the first diffraction optical element group 50 and the second diffraction optical element group 70 in which two diffraction optical elements having positive power are laminated are provided, so the occurrence of color shift in the image light L0 can be suppressed.

Therefore, according to the optical system 10 of the present exemplary embodiment, a high-quality image can be observed by the observer.

Note that in the embodiment described above, an example is given of a case in which the first interference pattern 54 and the third interference pattern 84 correspond to the green light LG, but the disclosure is not limited to this.

The first interference pattern 54 and the third interference pattern 84 may correspond to a wavelength band of any two or fewer of three colors of red, green, and blue of the image light L0.

For example, the first interference pattern 54 and the third interference pattern 84 may correspond to the green light LG and the blue light LB, and the second interference pattern 56 and the fourth interference pattern 86 may correspond to the red light LR.

Alternatively, the first interference pattern 54 and the third interference pattern 84 may correspond to the green light LG and the red light LR, and the second interference pattern 56 and the fourth interference pattern 86 may correspond to the blue light LB.

In this case as well, while the diffraction efficiency of the green light LG is slightly reduced compared to the configuration of the above-described embodiment, high image quality can be provided by diffracting the green light LG with high visibility and high impact on image quality at a position close to the light incident side.

Second Exemplary Embodiment

Next, an optical system according to a second exemplary embodiment will be described. In an optical system of the present exemplary embodiment, only the configurations of the first diffraction optical element group and the second diffraction optical element group are different from the above exemplary embodiment, and the other configuration is the same as the above exemplary embodiment. Therefore, in the following, configurations of the first diffraction optical element group and the second diffraction optical element group will be mainly described. Note that a configuration and a member the same as those of the exemplary embodiment described above will be given an identical reference sign, and description thereof will be omitted.

In the present exemplary embodiment, the first diffraction optical element group and the second diffraction optical element group have the same basic configurations.

Figure 9:
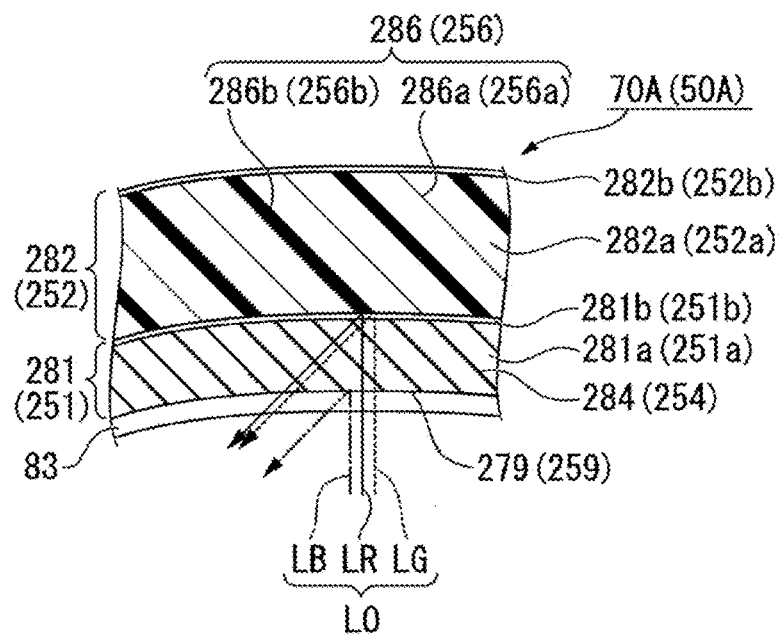
FIG. 9 is a diagram illustrating a configuration of first and second diffraction optical element groups according to a second exemplary embodiment.

FIG. 9 is a diagram illustrating configurations of a first diffraction optical element group 50A and a second diffraction optical element group 70A in the present exemplary embodiment. First, the configuration of the second diffraction optical element group will be described.

As illustrated in FIG. 9, the second diffraction optical element group 70A includes a third diffraction optical element 281 and a fourth diffraction optical element 282, which are stacked on a base 83 made of a light-transmitting material.

The third diffraction optical element 281 includes a base material 281b and a diffraction portion 281a. For example, the base material 281b is made of plastic and glass. In the diffraction portion 281a, third interference patterns 284 are formed. In the present exemplary embodiment, the third interference patterns 284 correspond to a wavelength range of any two or less colors out of three colors of red, green, and blue of image light L0, and specifically corresponds to blue light LB in a wavelength range of blue. The third interference patterns 284 are formed at a pitch corresponding to a wavelength of 460 nm, for example, in a wavelength range from 400 nm to 500 nm.

The third interference patterns 284 are recorded as a difference in refractive index and the like in a hologram photosensitive layer. The third interference patterns 284 are inclined in one direction with respect to a light incident surface 279 of the second diffraction optical element group 270 so as to correspond to a specific incident angle. In this manner, the third diffraction optical element 281 diffracts and polarizes the blue light LB of the image light L0 in a predetermined direction, while the third diffraction optical element 281 does not diffract red light LR and green light LG included in the image light L0 and causes the red light LR and the green light LG to be transmitted to the fourth diffraction optical element 282 side.

The fourth diffraction optical element 282 includes a base material 282b and a diffraction portion 282a. In the present exemplary embodiment, the fourth diffraction optical element 282 comes in contact with the third diffraction optical element 281. In the present exemplary embodiment, the thickness of the third diffraction optical element 281 is smaller than the thickness of the fourth diffraction optical element 282.

The base material 282b is made of a material similar to the material of the base material 281b of the third diffraction optical element 281. In the diffraction portion 282a, fourth interference patterns 286 are formed. The fourth interference patterns 286 correspond to the red light LR and the green light LG, which are two remaining colors of the image light L0. The fourth interference patterns 286 are formed in a state in which interference patterns 286a and interference patterns 286b are superimposed on each other. The interference patterns 286a are formed at a pitch corresponding to a wavelength of 615 nm, for example, in a wavelength range from 580 nm to 700 nm. The interference patterns 286b are formed at a pitch corresponding to a wavelength of 535 nm, for example, in a wavelength range from 500 nm to 580 nm.

For example, the fourth interference patterns 286 are formed in a state in which the two interference patterns 286a and 286b are superimposed on each other in one layer in the following manner. Specifically, photosensitive materials having sensitivity corresponding to respective wavelengths of red and green are dispersed in a holographic photosensitive layer, and then the holographic photosensitive layer is subjected to interference exposure by using reference light and object light in their respective wavelengths. The fourth diffraction optical element 282 utilizes the fourth interference patterns 286 to diffract and polarize the red light LR and the green light LG that transmitted through the third diffraction optical element 281, in respective predetermined directions.

Also in the second diffraction optical element group 270 of the present exemplary embodiment, a structure in which two reflection-type volume holograms corresponding to a wavelength range of a maximum of two colors are stacked is adopted. Therefore, similarly to the exemplary embodiment described above, as compared to a case where a structure corresponding to a wavelength range of three colors is used in a hologram of one layer, reduction in brightness of the image light L0 after diffraction can be prevented.

In the second diffraction optical element group 270 of the present exemplary embodiment, the thickness of the third diffraction optical element 281 is smaller than the thickness of the fourth diffraction optical element 282. In other words, the thickness of the third diffraction optical element 281 located on the light incident surface 279 side is small. Consequently, reduction in brightness due to optical loss of the red light LR and the blue light LB, which is caused when the red light LR and the blue light LB transmit through the third diffraction optical element 281, can be more easily prevented.

Also in the second diffraction optical element group 270 of the present exemplary embodiment, the third diffraction optical element 281 and the fourth diffraction optical element 282 are arranged in a stacked manner. Consequently, even when the second diffraction optical element group 270 has positive power, generation of color shift of the image light L0 can be prevented.

Generally, light extraction efficiency of a diffraction element differs depending on a wavelength range of incident light. Specifically, a diffraction element has the lowest light extraction efficiency in a wavelength range of blue. In the second diffraction optical element group 270 of the present exemplary embodiment, the third diffraction optical element 281 including the third interference patterns 284 corresponding to the blue light LB is provided on the light incident surface 279 side. Therefore, the blue light LB is diffracted by the third diffraction optical element 281, and this hardly causes optical absorption caused when the blue light LB transmits through the third diffraction optical element 281. Thus, in the second diffraction optical element group 270 of the present exemplary embodiment, generation of optical loss caused when the blue light LB having low extraction efficiency is absorbed can be prevented. As a result, the blue light LB can be efficiently used in image display.

A first diffraction optical element group 250 having the same basic configuration as the basic configuration of the second diffraction optical element group 270 includes a first diffraction optical element 251 and a second diffraction optical element 252, which are stacked on a base 93.

The first diffraction optical element 251 includes a base material 251b and a diffraction portion 251a. In the diffraction portion 251a, first interference patterns 254 are formed. Similarly to the third interference patterns 284, the first interference patterns 254 correspond to blue light LB in a wavelength range of blue.

The first diffraction optical element 251 diffracts and polarizes the blue light LB of image light L0 in a predetermined direction. According to the first diffraction optical element 251 of the present exemplary embodiment, similarly to the second diffraction optical element 252, generation of optical loss in a diffraction element, which is caused when the blue light LB having low light extraction efficiency is diffracted and thus the blue light LB is absorbed, can be prevented. As a result, the blue light LB can be efficiently used in image display.

The first diffraction optical element 251 does not diffract red light LR and green light LG included in the image light L0 and causes the red light LR and the green light LG to be transmitted to the second diffraction optical element 252 side. The second diffraction optical element 252 includes a base material 252b and a diffraction portion 252a. In the diffraction portion 252a, second interference patterns 256 are formed. The second interference patterns 256 are formed in a state in which interference patterns 256a and 256b are superimposed on each other. The interference patterns 256a and 256b respectively correspond to the red light LR and the green light LG, which are two remaining colors of the image light L0. The second interference patterns 256 can be produced in a method similar to a method of producing the third interference patterns 284.

In the present exemplary embodiment, the thickness of the first diffraction optical element 251 is smaller than the thickness of the second diffraction optical element 252. According to the first diffraction optical element group 250 of the present exemplary embodiment, similarly to the second diffraction optical element group 270, reduction in brightness of the image light L0 after diffraction can be prevented by separating the reflection-type volume hologram into two layers. According to the first diffraction optical element group 250 of the present exemplary embodiment, the first diffraction optical element 251 and the second diffraction optical element 252 are arranged in a stacked manner. Consequently, generation of color shift of the image light L0 can be prevented. According to the first diffraction optical element group 250 of the present exemplary embodiment, the thickness of the first diffraction optical element 251 located on a light incident surface 259 side is small. Consequently, reduction in brightness of the image light L0, which is caused when the image light L0 transmits through the first diffraction optical element 251, can be more easily prevented.

Note that the exemplary embodiment described above gives an example of a case where the first interference patterns 254 and the third interference patterns 284 correspond to the blue light LB. However, the present disclosure is not limited to such a case.

It is sufficient that the first interference patterns 254 and the third interference patterns 284 correspond to a wavelength range of any two or less colors out of three colors of red, green, and blue of the image light L0.

For example, the following configuration may be employed. Specifically, the first interference patterns 254 and the third interference patterns 284 may correspond to the blue light LB and the green light LG, and the second interference patterns 256 and the fourth interference patterns 286 may correspond to the red light LR.

Alternatively, the following configuration may be employed. Specifically, the first interference patterns 254 and the third interference patterns 284 may correspond to the blue light LB and the red light LR, and the second interference patterns 256 and the fourth interference patterns 286 may correspond to the green light LG.

While diffraction efficiency of the blue light LB is slightly reduced as compared to the configuration of the exemplary embodiment described above, also in these cases above, the blue light LB can be efficiently used in image display by diffracting the blue light LB having low extraction efficiency at a position close to the light incident side.

Third Exemplary Embodiment

Next, an optical system according to a third exemplary embodiment will be described. In an optical system of the present exemplary embodiment, only the configurations of the first diffraction optical element group and the second diffraction optical element group are different, and the other configuration is the same. Therefore, in the following, configurations of the first diffraction optical element group and the second diffraction optical element group will be mainly described. Note that a configuration and a member the same as those of the exemplary embodiment described above will be given an identical reference sign, and description thereof will be omitted.

In the present exemplary embodiment, the first diffraction optical element group and the second diffraction optical element group have the same basic configurations.

Figure 10A:
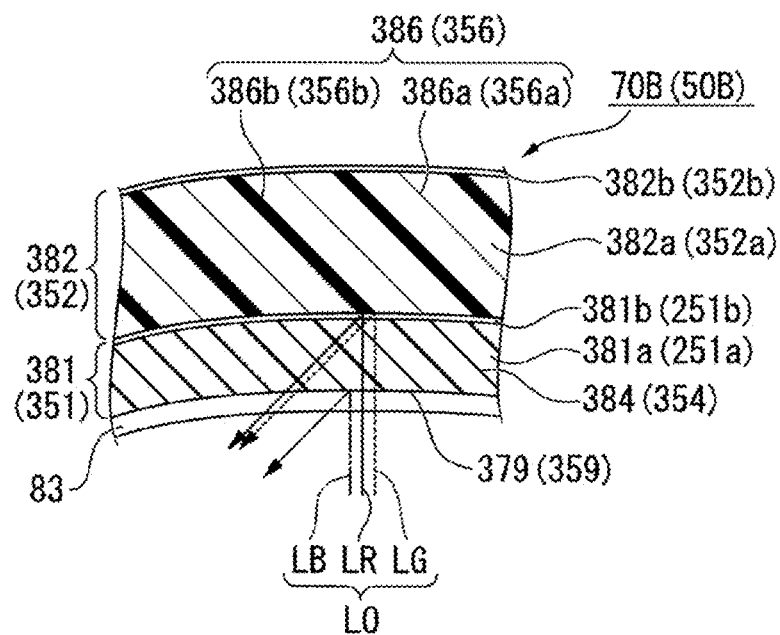
FIG. 10A is a diagram illustrating a configuration of first and second diffraction optical element groups according to a third exemplary embodiment.

FIG. 10A is a diagram illustrating configurations of a first diffraction optical element group 50B and a second diffraction optical element group 70B of the present exemplary embodiment. First, the configuration of the second diffraction optical element group will be described.

As illustrated in FIG. 10A, the second diffraction optical element group 70B includes a third diffraction optical element 381 and a fourth diffraction optical element 382, which are stacked on a base 83 made of a light-transmitting material.

The third diffraction optical element 381 includes a base material 381b and a diffraction portion 381a. For example, the base material 381b is made of plastic and glass. In the diffraction portion 381a, third interference patterns 384 are formed.

Figure 10B:
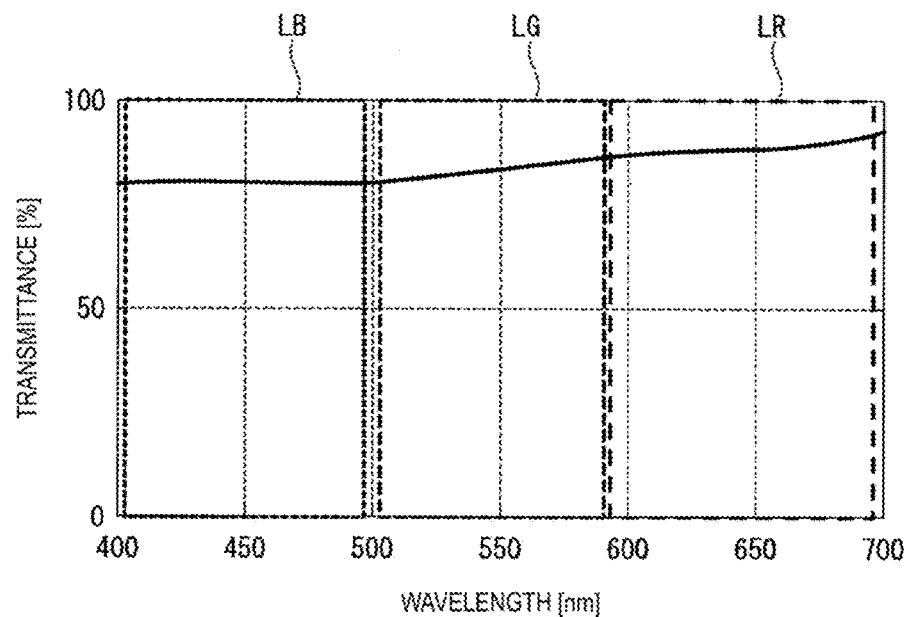
FIG. 10B is a diagram illustrating an example of transmittance characteristics of a third diffraction optical element.

FIG. 10B is a graph showing an example of transmittance characteristics of the third diffraction optical element 381. In FIG. 10B, the horizontal axis represents a wavelength of light to enter the third diffraction optical element 381, and the vertical axis represents transmittance of the light that entered the third diffraction optical element 381.

Transmittance characteristics of the third diffraction optical element 381 shown in FIG. 10B is dependent on a type of hologram photosensitive layer constituting the diffraction portion 381a. As shown in FIG. 10B, the third diffraction optical element 381 of the present exemplary embodiment has the following transmittance characteristics. Specifically, transmittance of blue in a wavelength range from 400 nm to 500 nm, for example, is the lowest, and transmittance of green in a wavelength range from 580 nm to 700 nm, for example, is the highest.

The third interference patterns 384 of the present exemplary embodiment correspond to a wavelength range of any two or less colors out of three colors of red, green, and blue of image light L0. Specifically, the third interference patterns 384 of the present exemplary embodiment correspond to the blue light LB in a wavelength range with the lowest transmittance of the third diffraction optical element 381 of the image light L0 shown in FIG. 10B.

The third diffraction optical element 381 diffracts and polarizes the blue light LB of the image light L0 in a predetermined direction, while the third diffraction optical element 381 does not diffract red light LR and green light LG included in the image light L0 and causes the red light LR and the green light LG to be transmitted to the fourth diffraction optical element 382 side.

The fourth diffraction optical element 382 includes a base material 382b and a diffraction portion 382a. In the present exemplary embodiment, the fourth diffraction optical element 382 comes in contact with the third diffraction optical element 381. In the present exemplary embodiment, the thickness of the third diffraction optical element 381 is smaller than the thickness of the fourth diffraction optical element 382.

The base material 382b is made of a material similar to the material of the base material 381b of the third diffraction optical element 381. In the diffraction portion 382a, fourth interference patterns 386 are formed. The fourth interference patterns 386 are formed in a state in which interference patterns 386a and 386b are superimposed on each other. The interference patterns 386a and 386b correspond to the red light LR and the green light LG, which are two remaining colors of the image light L0. Based on such a configuration, the fourth diffraction optical element 382 utilizes the fourth interference patterns 386 to diffract and polarize the red light LR and the green light LG that transmitted through the third diffraction optical element 381, in respective predetermined directions.

Also in a second diffraction optical element group 370 of the present exemplary embodiment, a structure in which two reflection-type volume holograms corresponding to a wavelength range of a maximum of two colors are stacked is adopted. Therefore, similarly to the exemplary embodiment described above, reduction in brightness of the image light L0 after diffraction can be prevented. In the second diffraction optical element group 370 of the present exemplary embodiment, the thickness of the third diffraction optical element 381 is smaller than the thickness of the fourth diffraction optical element 382. Consequently, reduction in brightness of the image light L0, which is caused when the image light L0 transmits through the third diffraction optical element 381, can be more easily prevented.

Also in the second diffraction optical element group 370 of the present exemplary embodiment, the third diffraction optical element 381 and the fourth diffraction optical element 382 are arranged in a stacked manner. Consequently, generation of color shift of the image light L0 can be prevented.

In the second diffraction optical element group 370 of the present exemplary embodiment, the blue light LB having the lowest transmittance in the third diffraction optical element 381 can be diffracted on a light incident surface 379 side, so as to be extracted. Thus, absorption of the blue light LB, which is caused when the blue light LB transmits through the third diffraction optical element 381, can be prevented. As a result, according to the second diffraction optical element group 370 of the present exemplary embodiment, the blue light LB can be efficiently used.

A first diffraction optical element group 350 having the same basic configuration as the basic configuration of the second diffraction optical element group 370 includes a first diffraction optical element 351 and a second diffraction optical element 352, which are stacked on a base 93. Note that transmittance characteristics of the first diffraction optical element 351 are characteristics similar to the characteristics of the third diffraction optical element 381 shown in FIG. 10B.

The first diffraction optical element 351 includes a base material 351b and a diffraction portion 351a. In the diffraction portion 351a, first interference patterns 354 are formed. Similarly to the third interference patterns 384, the first interference patterns 354 correspond to blue light LB in a wavelength range with the lowest transmittance of the first diffraction optical element 351 of the image light L0.

The first diffraction optical element 351 diffracts and polarizes the blue light LB of image light L0 in a predetermined direction. According to the first diffraction optical element 351 of the present exemplary embodiment, similarly to the second diffraction optical element 252, the blue light LB having the lowest light transmittance if the blue light LB transmits through the first diffraction optical element 351 is diffracted. Thus, generation of optical loss caused when the blue light LB is absorbed can be prevented. As a result, the blue light LB can be efficiently used in image display.

The first diffraction optical element 351 does not diffract red light LR and green light LG included in the image light L0 and causes the red light LR and the green light LG to be transmitted to the second diffraction optical element 352 side. The second diffraction optical element 352 includes a base material 352b and a diffraction portion 352a. In the diffraction portion 352a, second interference patterns 356 are formed. The second interference patterns 356 are formed in a state in which interference patterns 356a and 356b are superimposed on each other. The interference patterns 356a and 356b respectively correspond to the red light LR and the green light LG, which are two remaining colors of the image light L0.

In the present exemplary embodiment, the thickness of the first diffraction optical element 351 is smaller than the thickness of the second diffraction optical element 352. According to the first diffraction optical element group 350 of the present exemplary embodiment, similarly to the second diffraction optical element group 370, reduction in brightness of the image light L0 after diffraction can be prevented by separating the reflection-type volume hologram into two layers. According to the first diffraction optical element group 350 of the present exemplary embodiment, the first diffraction optical element 351 and the second diffraction optical element 352 are arranged in a stacked manner. Consequently, generation of color shift of the image light L0 can be prevented. According to the first diffraction optical element group 350 of the present exemplary embodiment, the thickness of the first diffraction optical element 351 located on a light incident surface 359 side is small. Consequently, reduction in brightness of the image light L0 can be more easily prevented.

Note that, in the exemplary embodiment described above, the blue light LB is exemplified as a wavelength range with the lowest transmittance of the first diffraction optical element 351 and the third diffraction optical element 381 of the image light L0. However, the present disclosure is not limited to such a case.

Fourth Exemplary Embodiment

Next, an optical system according to a fourth exemplary embodiment will be described. In an optical system of the present exemplary embodiment, only the configurations of the first diffraction optical element group and the second diffraction optical element group are different, and the other configuration is the same. Therefore, in the following, configurations of the first diffraction optical element group and the second diffraction optical element group will be mainly described. Note that a configuration and a member the same as those of the exemplary embodiment described above will be given an identical reference sign, and description thereof will be omitted.

In the present exemplary embodiment, the first diffraction optical element group and the second diffraction optical element group have the same basic configurations.

Figure 11:
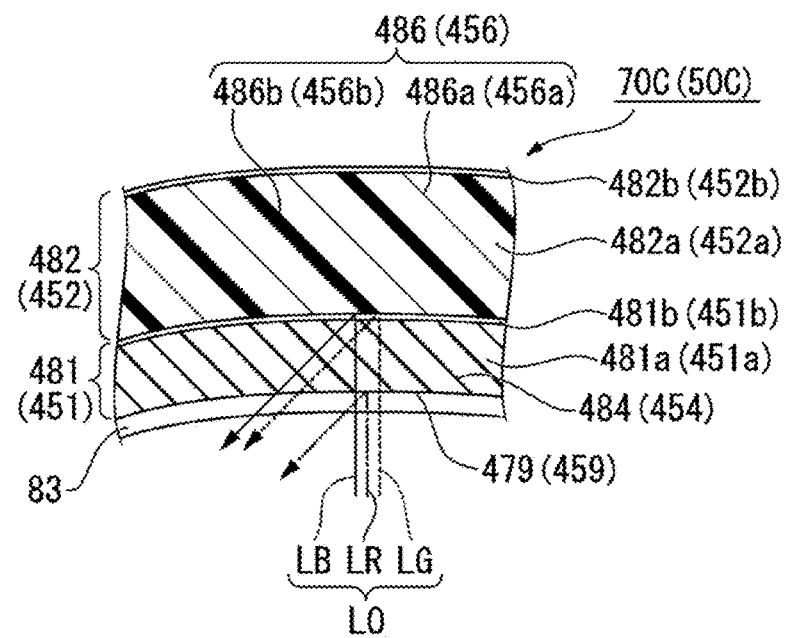
FIG. 11 is a diagram illustrating a configuration of first and second diffraction optical element groups according to a fourth exemplary embodiment.

FIG. 11 is a diagram illustrating configurations of a first diffraction optical element group 50C and a second diffraction optical element group 70C of the present exemplary embodiment. First, the configuration of the second diffraction optical element group will be described.

As illustrated in FIG. 11, the second diffraction optical element group 70C includes a third diffraction optical element 481 and a fourth diffraction optical element 482, which are stacked on a base 83 made of a light-transmitting material.

The third diffraction optical element 481 includes a base material 481b and a diffraction portion 481a. For example, the base material 481b is made of plastic and glass. In the diffraction portion 481a, third interference patterns 484 are formed. In the present exemplary embodiment, the third interference patterns 484 correspond to a wavelength range of any two or less colors out of three colors of red, green, and blue of image light L0. Specifically, the third interference patterns 484 correspond to light in a wavelength range with the lowest light intensity of the image light L0 emitted from the image light generating device 31. Note that light in a wavelength range with the lowest light intensity varies depending on performance of the image light generating device 31. In the present exemplary embodiment, for example, the red light LR has the highest light intensity.

The fourth diffraction optical element 482 includes a base material 482b and a diffraction portion 482a. In the present exemplary embodiment, the fourth diffraction optical element 482 comes in contact with the third diffraction optical element 481. In the present exemplary embodiment, the thickness of the third diffraction optical element 481 is smaller than the thickness of the fourth diffraction optical element 482.

The base material 482b is made of a material similar to the material of the base material 481b of the third diffraction optical element 481. In the diffraction portion 482a, fourth interference patterns 486 are formed. The fourth interference patterns 486 are formed in a state in which interference patterns 486a and 486b are superimposed on each other. The interference patterns 486a and 486b correspond to the blue light LB and the green light LG, which are two remaining colors of the image light L0. Based on such a configuration, the fourth diffraction optical element 482 utilizes the fourth interference patterns 486 to diffract and polarize the blue light LB and the green light LG that transmitted through the third diffraction optical element 481, in respective predetermined directions.

Also in a second diffraction optical element group 470 of the present exemplary embodiment, a structure in which two reflection-type volume holograms corresponding to a wavelength range of a maximum of two colors are stacked is adopted. Therefore, similarly to the exemplary embodiment described above, reduction in brightness of the image light L0 after diffraction can be prevented. In the second diffraction optical element group 470 of the present exemplary embodiment, the thickness of the third diffraction optical element 481 is smaller than the thickness of the fourth diffraction optical element 482. Consequently, reduction in brightness of the image light L0, which is caused when the image light L0 transmits through the third diffraction optical element 481, can be more easily prevented.

Also in the second diffraction optical element group 470 of the present exemplary embodiment, the third diffraction optical element 481 and the fourth diffraction optical element 482 are arranged in a stacked manner. Consequently, generation of color shift of the image light L0 can be prevented.

In the second diffraction optical element group 470 of the present exemplary embodiment, the red light LR having the lowest light intensity of the image light L0 emitted from the image light generating device 31 can be diffracted on a light incident surface 479 side, so as to be extracted. Thus, absorption of the red light LR, which is caused when the red light LR transmits through the third diffraction optical element 481, can be prevented. As a result, according to the second diffraction optical element group 470 of the present exemplary embodiment, the red light LR having the lowest light intensity can be efficiently used.

A first diffraction optical element group 450 having the same basic configuration as the basic configuration of the second diffraction optical element group 470 includes a first diffraction optical element 451 and a second diffraction optical element 452, which are stacked on a base 93.

The first diffraction optical element 451 includes a base material 451b and a diffraction portion 451a. In the diffraction portion 451a, first interference patterns 454 are formed. Similarly to the third interference patterns 484, the first interference patterns 454 correspond to red light LR having the lowest light intensity of the image light L0.

According to the first diffraction optical element 451 of the present exemplary embodiment, similarly to the second diffraction optical element 452, generation of optical loss, which is caused when the red light LR having the lowest light intensity is absorbed, can be prevented. As a result, the red light LR having the lowest light intensity can be efficiently used in image display.

The second diffraction optical element 452 includes a base material 452b and a diffraction portion 452a. In the diffraction portion 452a, second interference patterns 456 are formed. The second interference patterns 456 are formed in a state in which interference patterns 456a and 456b are superimposed on each other. The interference patterns 456a and 456b respectively correspond to the blue light LB and the green light LG, which are two remaining colors of the image light L0.

In the present exemplary embodiment, the thickness of the first diffraction optical element 451 is smaller than the thickness of the second diffraction optical element 452.

According to the first diffraction optical element group 450 of the present exemplary embodiment, similarly to the second diffraction optical element group 470, reduction in brightness of the image light L0 after diffraction can be prevented by separating the reflection-type volume hologram into two layers. According to the first diffraction optical element group 450 of the present exemplary embodiment, the first diffraction optical element 451 and the second diffraction optical element 452 are arranged in a stacked manner. Consequently, generation of color shift of the image light L0 can be prevented. According to the first diffraction optical element group 450 of the present exemplary embodiment, the thickness of the first diffraction optical element 451 located on a light incident surface 459 side is small. Consequently, reduction in brightness of the image light L0 can be more easily prevented.

Note that the exemplary embodiment described above gives an example of a case where the red light LR is exemplified as a wavelength range with the lowest light intensity of the image light L0 emitted from the image light generating device 31. However, the present disclosure is not limited to such a case.

Fifth Exemplary Embodiment

Next, an optical system according to a fifth exemplary embodiment will be described. In an optical system of the present exemplary embodiment, only the configurations of the first diffraction optical element group and the second diffraction optical element group are different, and the other configuration is the same. Therefore, in the following, configurations of the first diffraction optical element group and the second diffraction optical element group will be mainly described. Note that a configuration and a member the same as those of the exemplary embodiment described above will be given an identical reference sign, and description thereof will be omitted.

In the present exemplary embodiment, the first diffraction optical element group and the second diffraction optical element group have the same basic configurations.

Figure 12:
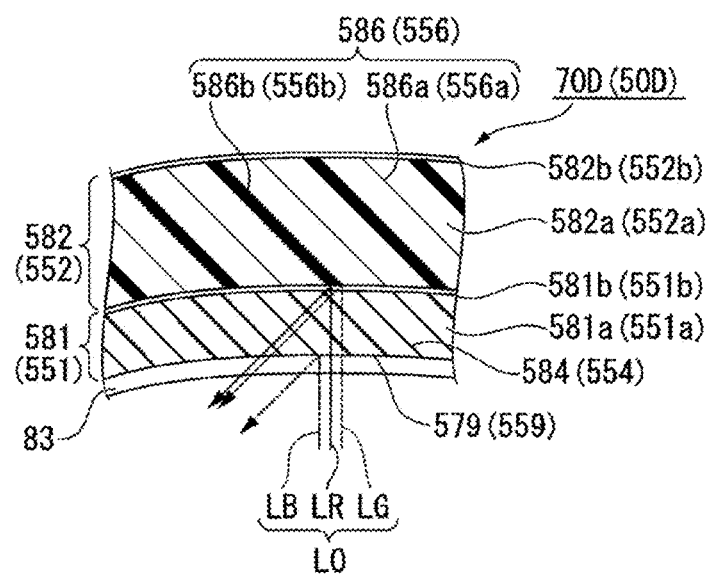
FIG. 12 is a diagram illustrating a configuration of first and second diffraction optical element groups according to a fifth exemplary embodiment.

FIG. 12 is a diagram illustrating configurations of a first diffraction optical element group 50D and a second diffraction optical element group 70D of the present exemplary embodiment. First, the configuration of the second diffraction optical element group will be described.

As illustrated in FIG. 12, the second diffraction optical element group 70D includes a third diffraction optical element 581 and a fourth diffraction optical element 582, which are stacked on a base 83 made of a light-transmitting material.

The third diffraction optical element 581 includes a base material 581b and a diffraction portion 581a. For example, the base material 581b is made of plastic and glass. In the diffraction portion 581a, third interference patterns 584 are formed. In the present exemplary embodiment, the third interference patterns 584 correspond to a wavelength range of any two or less colors out of three colors of red, green, and blue of image light L0. Specifically, the third interference patterns 584 correspond to a wavelength range that most affects white balance of the image light L0 emitted from the image light generating device 31. Here, the wavelength range that most affects white balance varies depending on characteristics of the image light L0 emitted from the image light generating device 31. In the present exemplary embodiment, for example, the blue light LB most affects white balance.

The fourth diffraction optical element 582 includes a base material 582b and a diffraction portion 582a. In the present exemplary embodiment, the fourth diffraction optical element 582 comes in contact with the third diffraction optical element 581. In the present exemplary embodiment, the thickness of the third diffraction optical element 581 is smaller than the thickness of the fourth diffraction optical element 582.

The base material 582b is made of a material similar to the material of the base material 581b of the third diffraction optical element 581. In the diffraction portion 582a, fourth interference patterns 586 are formed. The fourth interference patterns 586 are formed in a state in which interference patterns 586a and 586b are superimposed on each other. The interference patterns 586a and 586b correspond to the red light LR and the green light LG, which are two remaining colors of the image light L0. Based on such a configuration, the fourth diffraction optical element 582 utilizes the fourth interference patterns 586 to diffract and polarize the red light LR and the green light LG that transmitted through the third diffraction optical element 581, in respective predetermined directions.

Also in a second diffraction optical element group 570 of the present exemplary embodiment, a structure in which two reflection-type volume holograms corresponding to a wavelength range of a maximum of two colors are stacked is adopted. Therefore, similarly to the exemplary embodiment described above, reduction in brightness of the image light L0 after diffraction can be prevented. In the second diffraction optical element group 570 of the present exemplary embodiment, the thickness of the third diffraction optical element 581 is smaller than the thickness of the fourth diffraction optical element 582. Consequently, reduction in brightness of the image light L0, which is caused when the image light L0 transmits through the third diffraction optical element 581, can be more easily prevented.

Also in the second diffraction optical element group 570 of the present exemplary embodiment, the third diffraction optical element 581 and the fourth diffraction optical element 582 are arranged in a stacked manner. Consequently, generation of color shift of the image light L0 can be prevented.

In the second diffraction optical element group 570 of the present exemplary embodiment, the blue light LB that most affects white balance of the image light L0 emitted from the image light generating device 31 can be diffracted on a light incident surface 579 side, so as to be extracted. Thus, absorption of the blue light LB, which is caused when the blue light LB transmits through the third diffraction optical element 581, can be prevented. As a result, according to the second diffraction optical element group 570 of the present exemplary embodiment, the blue light LB that most affects white balance can be efficiently used. Consequently, white balance of the image light L0 can be more easily adjusted. Accordingly, an image of fine quality with optimally adjusted white balance can be displayed.

A first diffraction optical element group 550 having the same basic configuration as the basic configuration of the second diffraction optical element group 570 includes a first diffraction optical element 551 and a second diffraction optical element 552, which are stacked on a base 93.

The first diffraction optical element 551 includes a base material 551b and a diffraction portion 551a. In the diffraction portion 551a, first interference patterns 554 are formed. Similarly to the third interference patterns 584, the first interference patterns 554 correspond to red light LR having the lowest light intensity of the image light L0.

According to the first diffraction optical element 551 of the present exemplary embodiment, similarly to the second diffraction optical element 552, generation of optical loss, which is caused when the red light LR having the lowest light intensity is absorbed, can be prevented. As a result, the red light LR having the lowest light intensity can be efficiently used in image display.

The second diffraction optical element 552 includes a base material 552b and a diffraction portion 552a. In the diffraction portion 552a, second interference patterns 556 are formed. The second interference patterns 556 are formed in a state in which interference patterns 556a and 556b are superimposed on each other. The interference patterns 556a and 556b respectively correspond to the blue light LB and the green light LG, which are two remaining colors of the image light L0.

In the present exemplary embodiment, the thickness of the first diffraction optical element 551 is smaller than the thickness of the second diffraction optical element 552.

According to the first diffraction optical element group 550 of the present exemplary embodiment, similarly to the second diffraction optical element group 570, reduction in brightness of the image light L0 after diffraction can be prevented by separating the reflection-type volume hologram into two layers. According to the first diffraction optical element group 550 of the present exemplary embodiment, the first diffraction optical element 551 and the second diffraction optical element 552 are arranged in a stacked manner. Consequently, generation of color shift of the image light L0 can be prevented. According to the first diffraction optical element group 550 of the present exemplary embodiment, the thickness of the first diffraction optical element 551 located on a light incident surface 559 side is small. Consequently, reduction in brightness of the image light L0 can be more easily prevented.

Note that the exemplary embodiment described above gives an example of a case where the blue light LB is exemplified as a wavelength range that most affects white balance of the image light L0 emitted from the image light generating device 31. However, the present disclosure is not limited to such a case.

First Modified Example

Figure 13:
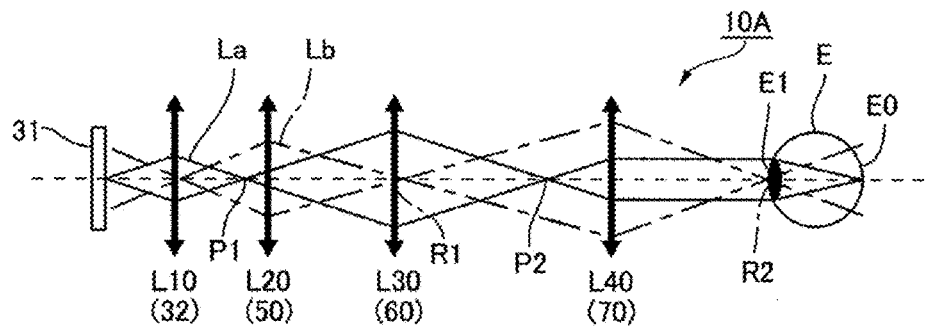
FIG. 13 is a light ray diagram of an optical system according to a first modified example.

FIG. 13 is a diagram of rays of light of an optical system 10A according to a first modified example. As illustrated in FIG. 13, in the optical system 10A of this modified example, a first optical unit L10 (projection optical system 32) having positive power, a second optical unit L20 having positive power and including the first diffraction optical element group 50, a third optical unit L30 (light guiding system 60) having positive power, and a fourth optical unit L40 having positive power and including the reflection-type second diffraction optical element group 70 are provided, along an optical path of image light emitted from the image light generating device 31.

A focal length of the first optical unit L10 is 4 L/11. A focal length of the second optical unit L20 is 6 L/11. A focal length of the third optical unit L30 is 3 L/4. A focal length of the fourth optical unit L40 is L. Thus, a ratio between an optical path length from the second optical unit L20 to the third optical unit L30 and an optical path length from the third optical unit L30 to the fourth optical unit L40 is 1:2. An optical path length from the second optical unit L20 to the third optical unit L30 is shorter than an optical path length from the third optical unit L30 to the fourth optical unit L40. Accordingly, even when the optical system 10 is downsized, a field of view is less liable to be blocked by the third optical unit L30.

Also in this modified example, similarly to the configuration of the first exemplary embodiment described with reference to FIG. 8, a first intermediate image P1 of image light is formed between the first optical unit L10 and the third optical unit L30. A pupil R1 is formed near the third optical unit L30. A second intermediate image P2 of the image light is formed between the third optical unit L30 and the fourth optical unit L40. The fourth optical unit L40 collimates the image light to form an exit pupil R2. In this modified example, similarly to the configuration of the first exemplary embodiment, the first intermediate image P1 is formed between the first optical unit L10 (projection optical system 32) and the second optical unit L20 (first diffraction optical element group 50).

Also in the optical system 10A of this modified example, similarly to the configuration of the first exemplary embodiment, Condition 1, where rays of light emitted from one point of the image light generating device 31 form an image as one point on a retina E0, is satisfied. Condition 2, where an entrance pupil of the optical system 10A and a pupil E1 of an eye E are in a conjugate relationship (conjugate relationship of pupils), is satisfied. Condition 3, where the first diffraction optical element group 50 and the second diffraction optical element group 70 are properly arranged, is satisfied. Condition 4, where the first diffraction optical element group 50 and the second diffraction optical element group 70 are in a conjugate or substantially conjugate relationship, is satisfied. Consequently, in the first diffraction optical element group 50 and the second diffraction optical element group 70, rays of light can be caused to enter a position with the same interference patterns, and color aberration can be canceled by properly performing wavelength compensation. As a result, deterioration in resolution of image light can be prevented.

Second Modified Example

Figure 14:
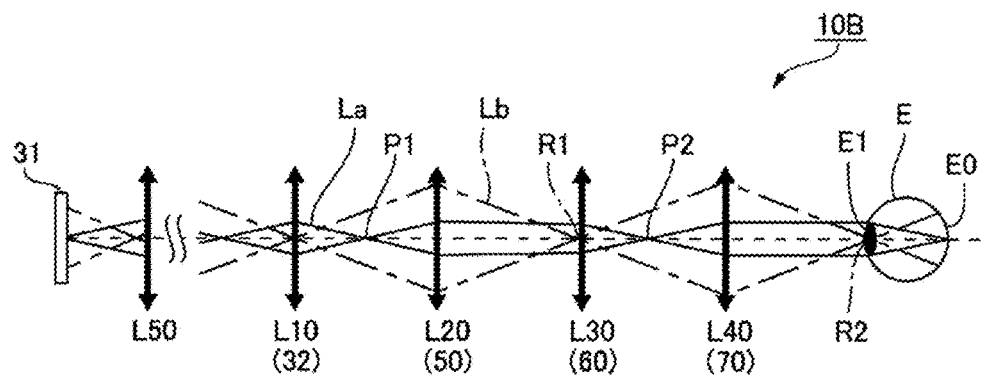
FIG. 14 is a light ray diagram of an optical system according to a second modified example.

FIG. 14 is a diagram of rays of light of an optical system 10B according to a second modified example. As illustrated in FIG. 14, in the optical system 10B of this modified example, a first optical unit L10 (projection optical system 32) having positive power, a second optical unit L20 having positive power and including the first diffraction optical element group 50, a third optical unit L30 (light guiding system 60) having positive power, and a fourth optical unit L40 having positive power and including the reflection-type second diffraction optical element group 70 are provided, along an optical path of image light emitted from the image light generating device 31. In this modified example, a fifth optical unit L50 is provided between the image light generating device 31 and the projection optical system 32.

Also in this modified example, similarly to the configuration of the first exemplary embodiment described with reference to FIG. 8, a first intermediate image P1 of image light is formed between the first optical unit L10 and the third optical unit L30. A pupil R1 is formed near the third optical unit L30. A second intermediate image P2 of the image light is formed between the third optical unit L30 and the fourth optical unit L40. The fourth optical unit L40 collimates the image light to form an exit pupil R2. Also in this modified example, similarly to the configuration of the first exemplary embodiment, the first intermediate image P1 is formed between the first optical unit L10 (projection optical system 32) and the second optical unit L20 (first diffraction optical element group 50). Specifically, in the configuration of the first exemplary embodiment described with reference to FIG. 8, the position at which the image light generating device 31 is arranged is regarded as an imaginary panel position. In this case, in the configuration illustrated in FIG. 14, the image light generating device 31 is arranged on an opposite side of the first optical unit L10 from the imaginary panel position. A length between the image light generating device 31 and the first optical unit L10 is larger than a length between the image light generating device 31 and the first optical unit L10 in the configuration of the first exemplary embodiment described with reference to FIG. 8. Also in such a case, the fifth optical unit L50 is provided between the image light generating device 31 and the projection optical system 32. Consequently, after reaching the first optical unit L10, rays of light emitted from the image light generating device 31 travel in a similar manner as in the configuration of the first exemplary embodiment described with reference to FIG. 8.

Therefore, also in the optical system 10B of this modified example, similarly to the configuration of the first exemplary embodiment, Condition 1, where rays of light emitted from one point of the image light generating device 31 form an image as one point on a retina E0, is satisfied. Condition 2, where an entrance pupil of the optical system 10B and a pupil E1 of an eye E are in a conjugate relationship (conjugate relationship of pupils), is satisfied. Condition 3, where the first diffraction optical element group 50 and the second diffraction optical element group 70 are properly arranged, is satisfied. Condition 4, where the first diffraction optical element group 50 and the second diffraction optical element group 70 are in a conjugate or substantially conjugate relationship, is satisfied. Consequently, in the first diffraction optical element group 50 and the second diffraction optical element group 70, rays of light can be caused to enter a position with the same interference patterns, and color aberration can be canceled by properly performing wavelength compensation. As a result, deterioration in resolution of image light can be prevented.

Third Modified Example

Figure 15:
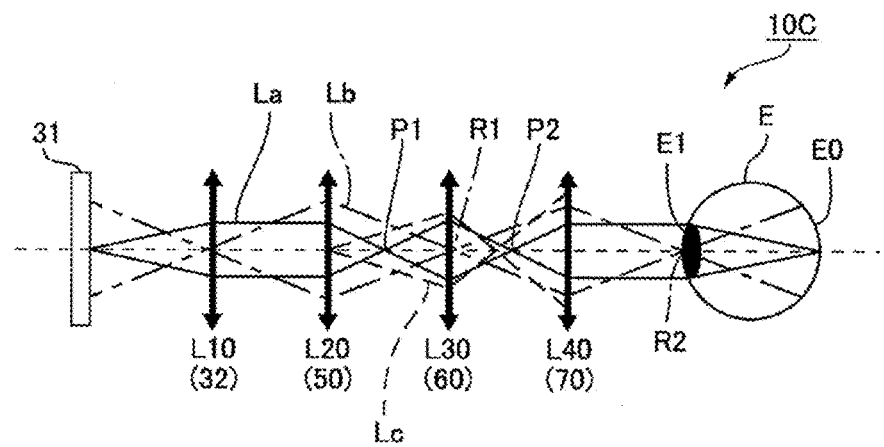
FIG. 15 is a light ray diagram of an optical system according to a third modified example.

FIG. 15 is a diagram of rays of light of an optical system 10C according to a third modified example. As illustrated in FIG. 15, in the optical system 10C of this modified example, a first optical unit L10 (projection optical system 32) having positive power, a second optical unit L20 having positive power and including the first diffraction optical element group 50, a third optical unit L30 (light guiding system 60) having positive power, and a fourth optical unit L40 having positive power and including the reflection-type second diffraction optical element group 70 are provided, along an optical path of image light emitted from the image light generating device 31.

Also in this modified example, similarly to the configurations of the first exemplary embodiment, the first modified example, and the second modified example, a first intermediate image P1 of image light is formed between the first optical unit L10 and the third optical unit L30. A pupil R1 is formed near the third optical unit L30. A second intermediate image P2 of the image light is formed between the third optical unit L30 and the fourth optical unit L40. The fourth optical unit L40 collimates the image light to form an exit pupil R2.

In this modified example, unlike the configurations of the first exemplary embodiment, the first modified example, and the second modified example, the first intermediate image P1 is formed between the second optical unit L20 (first diffraction optical element group 50) and the third optical unit L30 (light guiding system 60).

Also in the optical system 10C, similarly to the configuration of the first exemplary embodiment, Condition 1, where rays of light emitted from one point of the image light generating device 31 form an image as one point on a retina E0, is satisfied. Condition 2, where an entrance pupil of the optical system 10C and a pupil E1 of an eye E are in a conjugate relationship (conjugate relationship of pupils), is satisfied. Condition 3, where the first diffraction optical element group 50 and the second diffraction optical element group 70 are properly arranged, is satisfied. Note that, in the optical system 10C of this modified example, Condition 4, where the first diffraction optical element group 50 and the second diffraction optical element group 70 are in a conjugate or substantially conjugate relationship, is not satisfied. Also in this case, the third optical unit L30 can cause light polarized by the first diffraction optical element group 50 to be shifted from a specific wavelength of the image light from one point of the image light generating device 31 to enter a predetermined range of the second diffraction optical element group 70. Therefore, the problem that light enters a place with different interference patterns is compensated by the third optical unit L30. Thus, light in a peripheral wavelength of the specific wavelength can also enter near the light in the specific wavelength, and color aberration can be substantially canceled by performing wavelength compensation. As a result, deterioration in resolution can be prevented. Specifically, according to the optical system 10C of this modified example, as compared to the configuration of the first exemplary embodiment, for example, a wavelength compensation effect is lower, but a constant wavelength compensation effect can be achieved when an aperture ratio is small.

Fourth Modified Example

Figure 16:
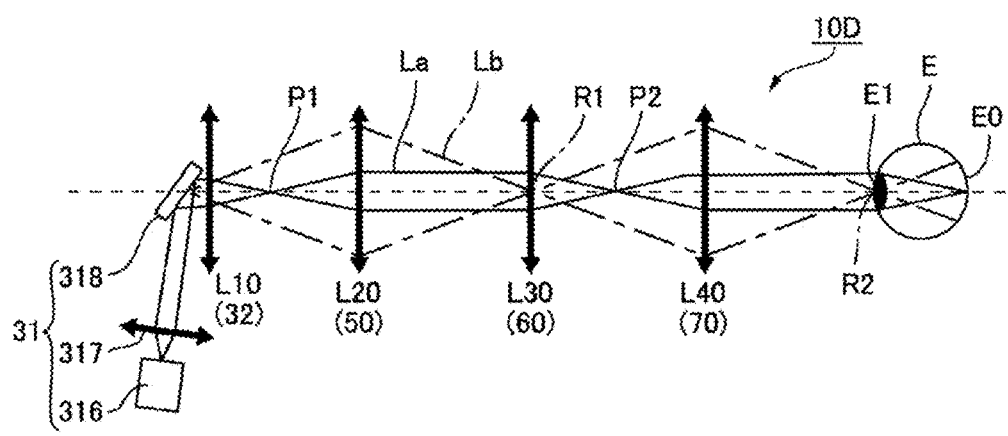
FIG. 16 is a light ray diagram of an optical system according to a fourth modified example.
Figure 17:
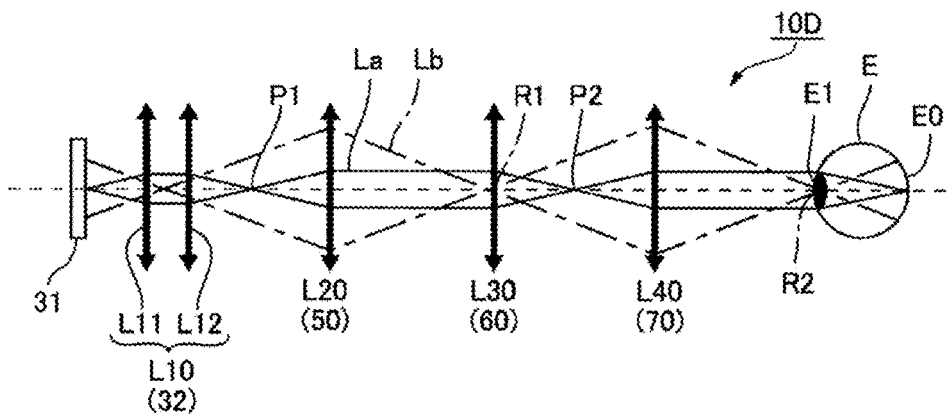
FIG. 17 is an explanatory diagram of a first optical unit in the optical system of the fourth modified example.

FIG. 16 is a diagram of rays of light of an optical system 10D according to a fourth modified example. FIG. 17 is an explanatory diagram of the first optical unit L10 according to this modified example. As illustrated in FIG. 16, similarly to the configuration of the first exemplary embodiment described with reference to FIG. 8, in the optical system 10D of this modified example, a first optical unit L10 (projection optical system 32) having positive power, a second optical unit L20 having positive power and including the first diffraction optical element group 50, a third optical unit L30 (light guiding system 60) having positive power, and a fourth optical unit L40 having positive power and including the reflection-type second diffraction optical element group 70 are provided. Here, the image light generating device 31 includes a laser light source 316, a collimate lens 317, and a micro mirror device 318. The image light generating device 31 drives the micro mirror device 318 to scan the laser light source 316. In this manner, the image light generating device 31 generates an image. Accordingly, the image light generating device 31 itself forms light of an angle of view.

Therefore, as illustrated in FIG. 17, as compared to a case where a pupil is formed between lenses L11 and L12 used in the first optical unit L10 in the configuration of the first exemplary embodiment described with reference to FIG. 8, the image light generating device 31 and the lens L11 are replaced by the laser light source 316, the collimate lens 317, and the micro mirror device 318 described above.

According to the optical system 10D, in a case where the display device 100 is worn, even when temperature change occurs due to body temperature or heat of the display device 100 itself and thereby a spectral width of laser light varies, for example, image quality of an image can be enhanced by means of wavelength compensation.

Fifth Modified Example

Figure 18:
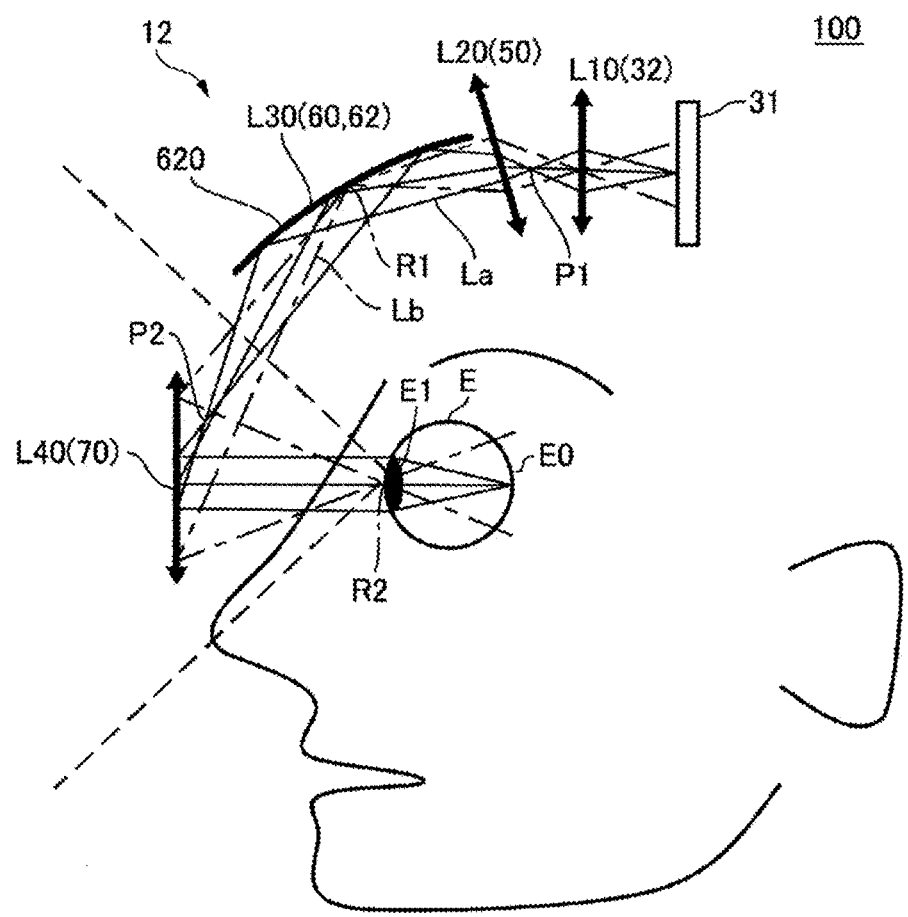
FIG. 18 is an explanatory diagram of an optical system according to a fifth modified example.

FIG. 18 is an explanatory diagram of a display device according to a fifth modified example. An optical system 12 illustrated in FIG. 18 is arranged along the vertical direction as illustrated in FIG. 2. The projection optical system 32, the first diffraction optical element group 50, and the light guiding system 60 are arranged between the image light generating device 31 arranged at the top of the head and the second diffraction optical element group 70 located in front of the eye E. In this modified example, the light guiding system 60 has positive power, and includes a mirror 62 including a reflection surface 620 with its center being concave with respect to a peripheral portion. The reflection surface 620 includes a spherical surface, an aspherical surface, or a free form surface. In this modified example, the reflection surface 620 includes a free form surface. The first diffraction optical element group 50 has positive power, and includes a transmission-type volume holographic element and a lens that are integrated with each other. Note that the first diffraction optical element group 50 itself may be configured to have positive power.

In the optical system 12 of this modified example, similarly to the first modified example described with reference to FIG. 13, a first optical unit L10 (projection optical system 32) having positive power, a second optical unit L20 having positive power and including the first diffraction optical element group 50, a third optical unit L30 (mirror 62 of light guiding system 60) having positive power, and a fourth optical unit L40 having positive power and including the reflection-type second diffraction optical element group 70 are provided, along an optical path of image light emitted from the image light generating device 31. Thus, a first intermediate image P1 of image light is formed between the first optical unit L10 and the third optical unit L30. A pupil R1 is formed near the third optical unit L30. A second intermediate image P2 of the image light is formed between the third optical unit L30 and the fourth optical unit L40. The fourth optical unit L40 collimates the image light to form an exit pupil R2.

Here, the third optical unit L30 includes the mirror 62 having positive power. Accordingly, diverging rays of light diffracted by the second optical unit L20 are condensed by the mirror 62. The condensed light enters a point of the fourth optical unit L40 (second diffraction optical element group 70) where light in a specific wavelength enters, or the concentrated light enters a region near the point.

Also in the optical system 12 of this modified example, similarly to the first modified example described with reference to FIG. 13, Condition 1, where rays of light emitted from one point of the image light generating device 31 form an image as one point on a retina E0, is satisfied. Condition 2, where an entrance pupil of the optical system 12 and a pupil E1 of an eye E are in a conjugate relationship (conjugate relationship of pupils), is satisfied. Condition 3, where the first diffraction optical element group 50 and the second diffraction optical element group 70 are properly arranged, is satisfied. Condition 4, where the first diffraction optical element group 50 and the second diffraction optical element group 70 are in a conjugate or substantially conjugate relationship, is satisfied. Consequently, in the first diffraction optical element group 50 and the second diffraction optical element group 70, rays of light can be caused to enter a position with the same interference patterns, and color aberration can be canceled by properly performing wavelength compensation. As a result, deterioration in resolution of image light can be prevented.

Sixth Modified Example

Figure 19:
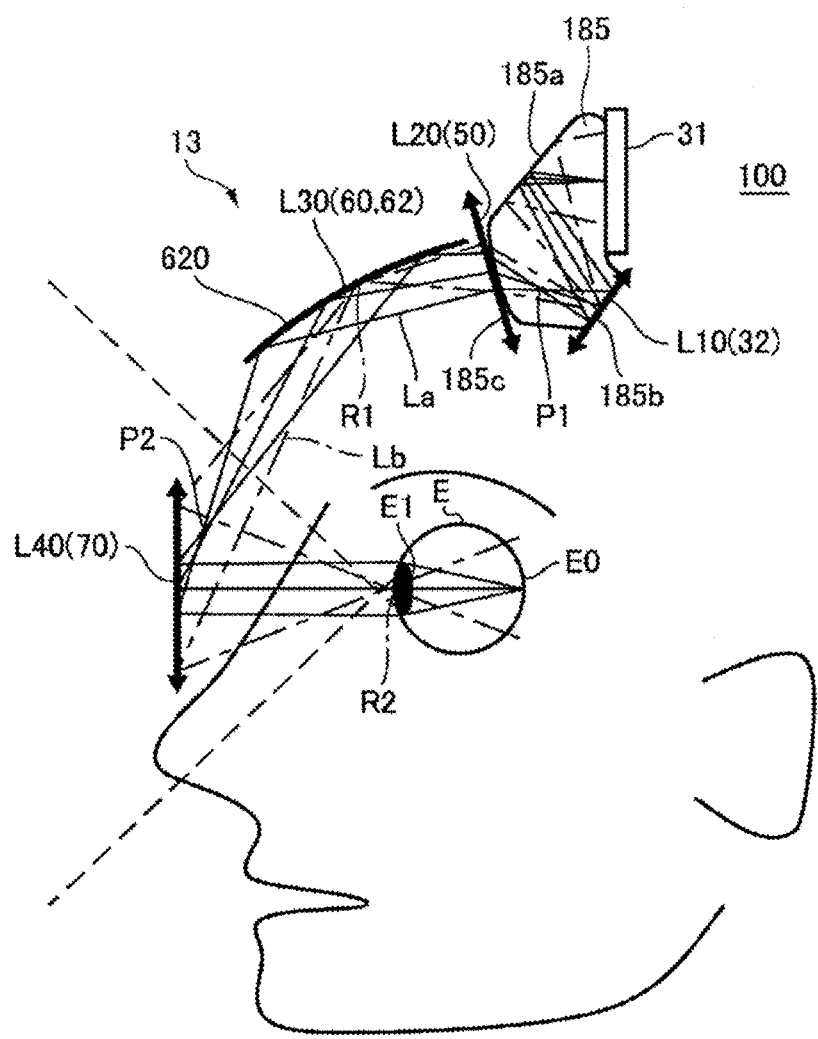
FIG. 19 is an explanatory diagram of an optical system according to a sixth modified example.

FIG. 19 is an explanatory diagram of a display device according to a sixth modified example. In the optical system 12 illustrated in FIG. 18, the first optical unit L10 (projection optical system 32) and the second optical unit L20 (first diffraction optical element group 50) are separate from each other. However, in an optical system 13 of this modified example, as illustrated in FIG. 19, the first optical unit L10 (projection optical system) and the second optical unit L20 (first diffraction optical element group 50) are integrated with each other. More specifically, the first optical unit L10 (projection optical system 32) includes a prism 185 including a plurality of reflection surfaces 185a and 185b. A light emission surface 185c of the prism 185 includes the second optical unit L20 (transmission-type first diffraction optical element group 50).

The other configuration is the same as the configuration of the fifth modified example described with reference to FIG. 18. Accordingly, similarly to the aspect illustrated in FIG. 18, color aberration can be canceled by properly performing wavelength compensation. As a result, deterioration in resolution of image light can be prevented. With the use of the prism 185, the first optical unit L10 (projection optical system 32) and the second optical unit L20 (first diffraction optical element group 50) are integrated with each other. Consequently, reduction in assembly tolerance and downsizing in a front and back direction of the head can be achieved, for example.

Seventh Modified Example

Figure 20:
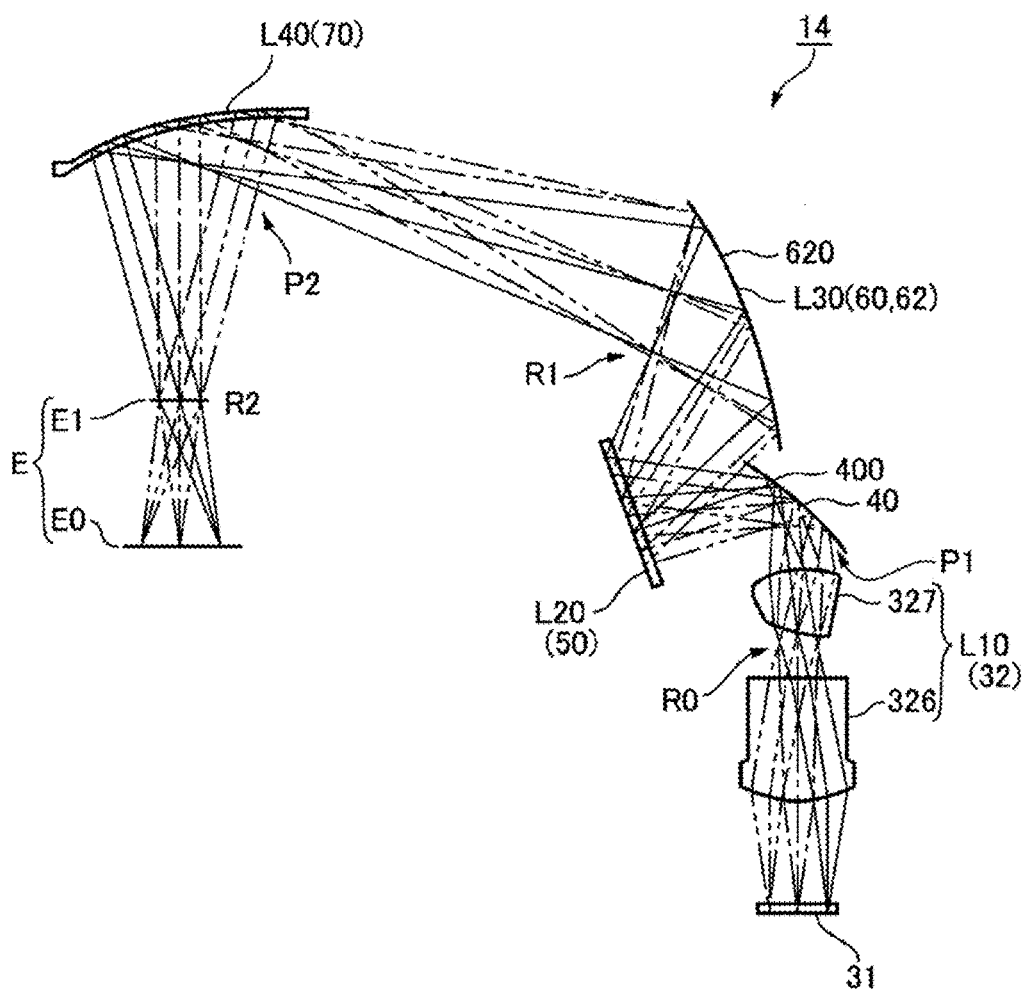
FIG. 20 is an explanatory diagram of an optical system according to a seventh modified example.

FIG. 20 is an explanatory diagram of a display device according to a seventh modified example. Similarly to the aspect described with reference to FIG. 1 and FIG. 3, in an optical system 14 illustrated in FIG. 20, the projection optical system 32, the first diffraction optical element group 50, and the light guiding system 60 are arranged between the image light generating device 31 arranged at the side of the head and the second diffraction optical element group 70 located in front of the eye E. In this modified example, the projection optical system 32 includes a rotationally symmetric lens 326 and a free form lens 327. The light guiding system 60 has positive power, and includes a mirror 62 including a reflection surface 620 with its center being concave with respect to a peripheral portion. The reflection surface 620 includes a spherical surface, an aspherical surface, or a free form surface. In this modified example, the reflection surface 620 includes a free form surface. The first diffraction optical element group 50 includes a reflection-type volume hologram. A mirror 40 is arranged at some point in an optical path extending from the projection optical system 32 to the first diffraction optical element group 50. The projection optical system 32 forms an intermediate image (first intermediate image P1) on a reflection surface of the mirror 40 or near the reflection surface. The mirror 40 has positive power, and includes a reflection surface 400 including a concave curved surface. When the reflection surface 400 of the mirror 40 has positive power, the mirror 40 may be included as a component of the projection optical system 32. In other words, when the mirror 40 has positive power, the first optical unit L10 may include the mirror 40. Note that the reflection surface 400 of the mirror 40 may include a flat surface, and the mirror 40 may not have power.

In the optical system 14 configured as described above, similarly to the first modified example described with reference to FIG. 13, a first optical unit L10 (projection optical system 32) having positive power, a second optical unit L20 having positive power and including the first diffraction optical element group 50, a third optical unit L30 (mirror 62 of light guiding system 60) having positive power, and a fourth optical unit L40 having positive power and including the reflection-type second diffraction optical element group 70 are provided, along an optical path of image light emitted from the image light generating device 31.

In the optical system 14 of this modified example, the first optical unit L10 includes the plurality of lenses 326 and 327. The lens 326 out of the plurality of lenses 326 and 327 is a lens located closest to the image light generating device 31.

In the optical system 14 of this modified example, a pupil R0 is formed between the lens 326 and the lens 327 of the first optical unit L10. A pupil R1 is formed near the third optical unit L30. A second intermediate image P2 of image light is formed between the third optical unit L30 and the fourth optical unit L40. The fourth optical unit L40 collimates the image light to form an exit pupil R2.

The first intermediate image P1 and the second intermediate image P2 illustrated in FIG. 20 are intermediate images of image light diffused in the horizontal direction along the drawing sheet. Image light emitted from the image light generating device 31 is diffused in the vertical direction orthogonal to the drawing sheet of FIG. 20 as well as in the horizontal direction, and therefore an intermediate image of the image light diffused in the vertical direction is also present. In this modified example, an intermediate image in the vertical direction is present near an intermediate image in the horizontal direction.

Note that, in the optical system 14 of this modified example, the first intermediate image P1 is formed near the mirror 40, However, the first intermediate image P1 may be formed in the first optical unit L10 (projection optical system 32).

Figure 21:
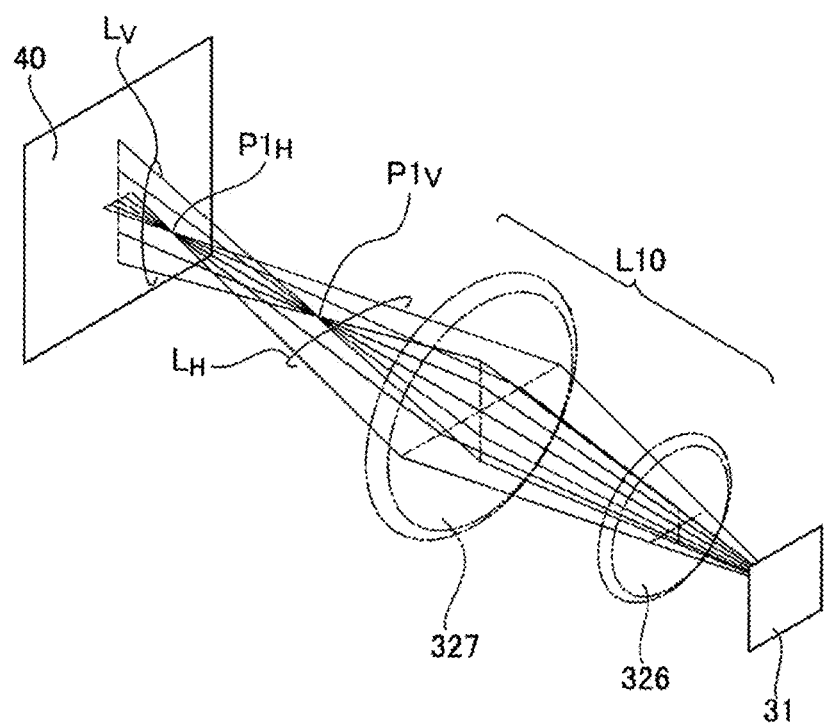
FIG. 21 is a diagram in which the positions of intermediate images in the horizontal direction and the vertical direction are different from each other.

An intermediate image in the horizontal direction and an intermediate image in the vertical direction may be present at different positions. FIG. 21 is a diagram of rays of light in a case where positions of intermediate images in the horizontal direction and the vertical direction are different, and FIG. 21 is a diagram of rays of image light in the horizontal direction and the vertical direction. In FIG. 21, a reference sign $L_H$ represents image light in the horizontal direction. A reference sign $P1_H$ represents a first intermediate image of the image light $L_H$ in the horizontal direction. A reference sign $L_V$ represents image light in the vertical direction. A reference sign $P1_V$ represents a first intermediate image of the image light $L_V$ in the vertical direction. In FIG. 21, the image light generating device 31, the first optical unit L10 (projection optical system 32), and the mirror 40 that are arranged along an optical axis are schematically illustrated. In FIG. 21, the shapes of the lenses 326 and 327 constituting the projection optical system 32 are also simplified.

As illustrated in FIG. 21, the first intermediate image $P1_H$ in the horizontal direction is located near the mirror 40. The first intermediate image $P1_V$ in the vertical direction is arranged nearer the first optical unit L10 than the first intermediate image $P1_H$ in the horizontal direction.

FIG. 21 illustrates a case where positions of intermediate images are different between the horizontal direction and the vertical direction in the first intermediate images P1. However, positions may also be different between the horizontal direction and the vertical direction in the second intermediate images. When positions of intermediate images are different between the horizontal direction and the vertical direction in the first intermediate images P1, one of the first intermediate image $P1_H$ and the first intermediate image $P1_V$ may be formed in the first optical unit L10, and the other of the first intermediate image $P1_H$ and the first intermediate image $P1_V$ may be formed outside the first optical unit L10.

Also in the optical system 14 of this modified example, similarly to the first modified example described with reference to FIG. 13, Condition 1, where rays of light emitted from one point of the image light generating device 31 form an image as one point on a retina E0, is satisfied. Condition 2, where an entrance pupil of the optical system 10 and a pupil E1 of an eye E are in a conjugate relationship (conjugate relationship of pupils), is satisfied. Condition 3, where the first diffraction optical element group 50 and the second diffraction optical element group 70 are properly arranged, is satisfied. Condition 4, where the first diffraction optical element group 50 and the second diffraction optical element group 70 are in a conjugate or substantially conjugate relationship, is satisfied. Consequently, in the first diffraction optical element group 50 and the second diffraction optical element group 70, rays of light can be caused to enter a position with the same interference patterns, and color aberration can be canceled by properly performing wavelength compensation. As a result, deterioration in resolution of image light can be prevented.

An optical member in which high dispersion and low dispersion are combined is used for plastic, glass, or the like that constitutes a light-transmitting member out of members illustrated in FIG. 20. The mirror 62 is used in the third optical unit L30, and therefore the first optical unit L10 is achromatic. This shifts the centroid position of the optical system 14 toward the rear side Z2, which is advantageous in that burden on the nose of a user can be alleviated, for example. When a semi-transparent mirror layer or a mirror layer with angular selectivity is formed for the mirror 62 by processing a transparent member such as a transparent resin or glass with a sputtering method, for example, an outside area can be visibly recognized through the mirror 62.

Eighth Modified Example

Figure 22:
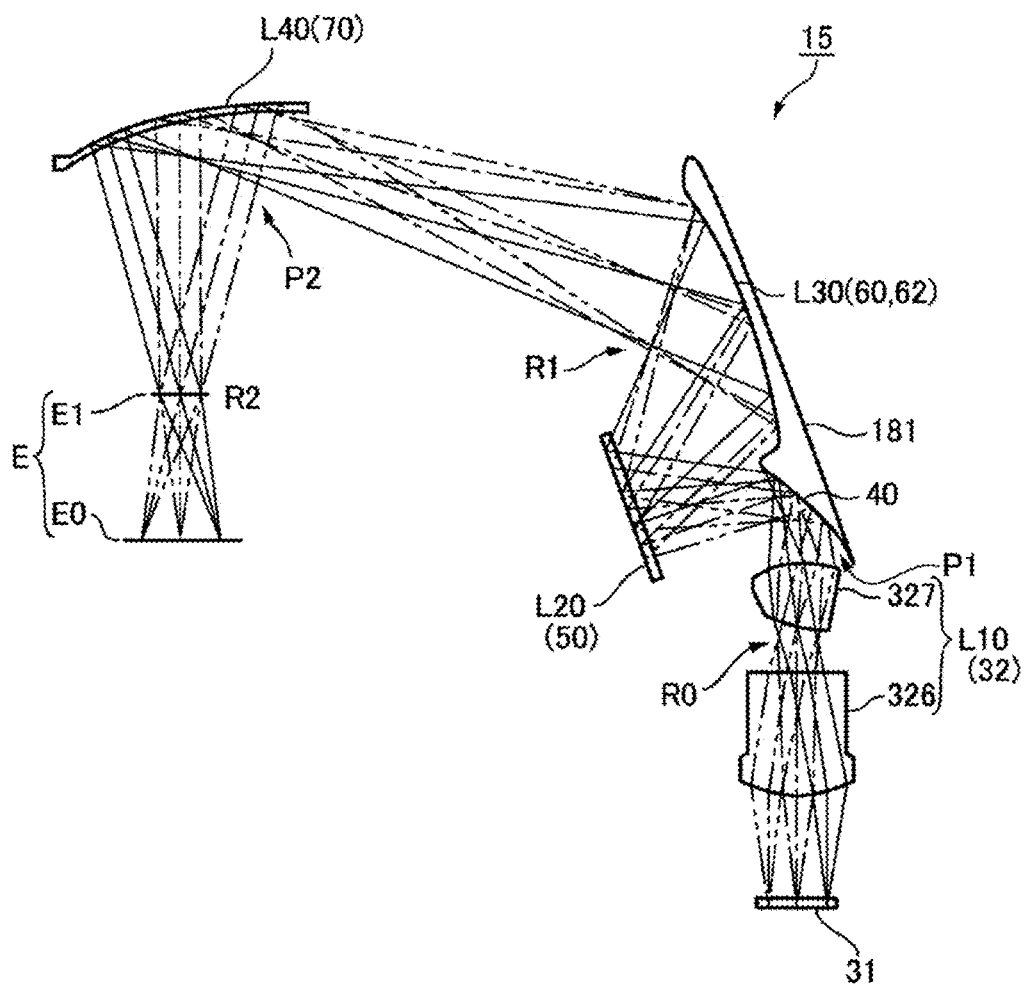
FIG. 22 is an explanatory diagram of an optical system according to an eighth modified example.

FIG. 22 is an explanatory diagram of a display device according to an eighth modified example. In an optical system 15 illustrated in FIG. 22, similarly to the seventh modified example described with reference to FIG. 20, the projection optical system 32 (first optical unit L10), the mirror 40, the first diffraction optical element group 50 (second optical unit L20), and the mirror 62 of the light guiding system 60 (third optical unit L30) are arranged between the image light generating device 31 arranged at the side of the head and the second diffraction optical element group 70 (fourth optical unit L40) located in front of the eye E.

In this modified example, the mirror 40 and the mirror 62 are formed at different surfaces of a common member 181. The other configuration is the same as the configuration of the seventh modified example illustrated in FIG. 20. Accordingly, similarly to the seventh modified example illustrated in FIG. 20, wavelength compensation can be properly performed. The mirror 40 and the mirror 62 are formed in the common member 181, and therefore reduction in assembly tolerance can be achieved, for example. The number of types of molds for manufacturing mirrors can be reduced, and therefore reduction in costs can be achieved.

Ninth Modified Example

Figure 23:
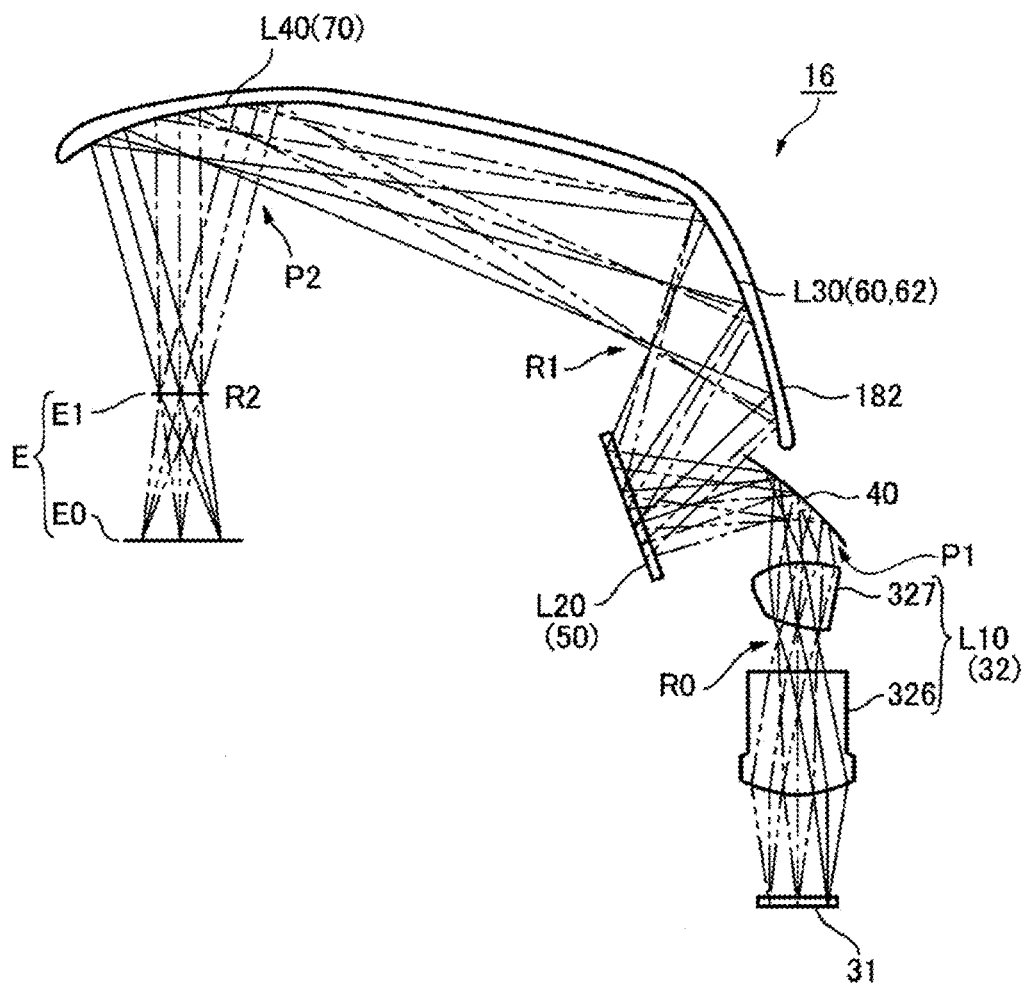
FIG. 23 is an explanatory diagram of an optical system according to a ninth modified example.

FIG. 23 is an explanatory diagram of a display device according to a ninth modified example. In an optical system 16 illustrated in FIG. 23, similarly to the seventh modified example described with reference to FIG. 20, the projection optical system 32 (first optical unit L10), the mirror 40, the first diffraction optical element group 50 (second optical unit L20), and the mirror 62 of the light guiding system 60 (third optical unit L30) are arranged between the image light generating device 31 arranged at the side of the head and the second diffraction optical element group 70 (fourth optical unit L40) located in front of the eye E.

In this modified example, the mirror 62 and the second diffraction optical element group 70 are formed at different surfaces of a common member 182. The other configuration is the same as the configuration of the seventh modified example illustrated in FIG. 20. Accordingly, similarly to the seventh modified example illustrated in FIG. 20, wavelength compensation can be properly performed. The mirror 62 and the second diffraction optical element group 70 are formed in the common member 182, and therefore reduction in assembly tolerance can be achieved, for example. The number of types of molds for manufacturing mirrors can be reduced, and therefore reduction in costs can be achieved.

Tenth Modified Example

Figure 24:
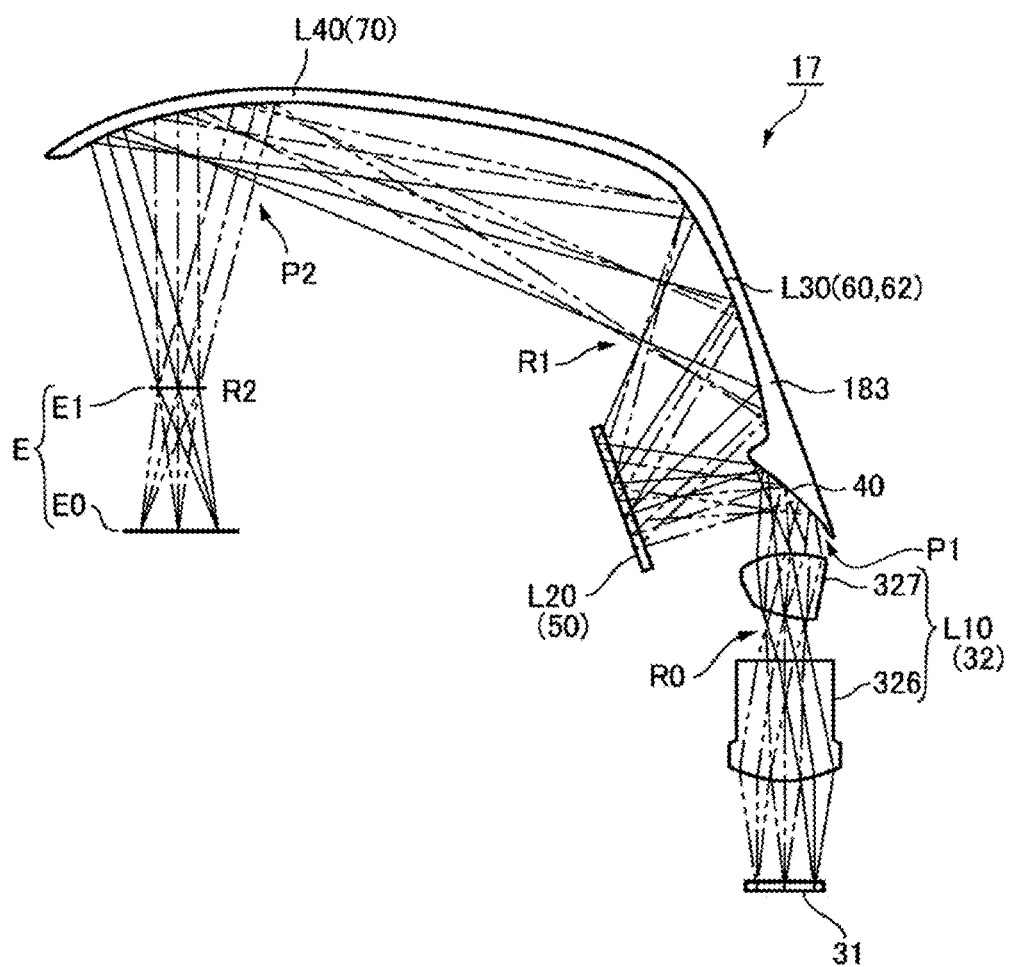
FIG. 24 is an explanatory diagram of an optical system according to a tenth modified example.

FIG. 24 is an explanatory diagram of a display device according to a tenth modified example. In an optical system 17 illustrated in FIG. 24, similarly to the seventh modified example described with reference to FIG. 20, the projection optical system 32 (first optical unit L10), the mirror 40, the first diffraction optical element group 50 (second optical unit L20), and the mirror 62 of the light guiding system 60 (third optical unit L30) are arranged between the image light generating device 31 arranged at the side of the head and the second diffraction optical element group 70 (fourth optical unit L40) located in front of the eye E.

In this modified example, the mirror 40, the mirror 62, and the second diffraction optical element group 70 are formed at different surfaces of a common member 183. The other configuration is the same as the configuration of the seventh modified example illustrated in FIG. 20. Accordingly, similarly to the seventh modified example illustrated in FIG. 20, wavelength compensation can be properly performed. The mirror 40, the mirror 62, and the second diffraction optical element group 70 are formed in the common member 183, and therefore reduction in assembly tolerance can be achieved, for example. The number of types of molds for manufacturing mirrors can be reduced, and therefore reduction in costs can be achieved.

Eleventh Modified Example

Next, an optical system according to an eleventh modified example will be described. In an optical system of this modified example, the first diffraction optical element group 50 and the second diffraction optical element group 70 are in a substantially conjugate relationship. In the following, the substantially conjugate relationship between the first diffraction optical element group 50 and the second diffraction optical element group 70 will be described.

Figure 25:
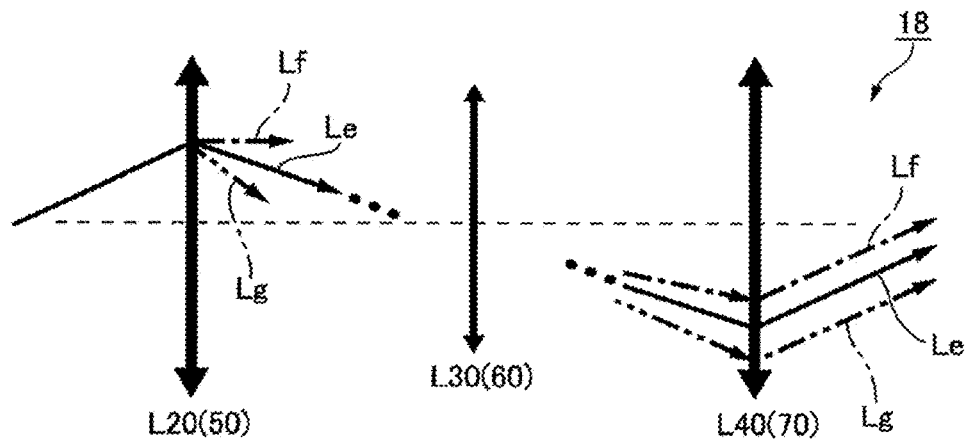
FIG. 25 is a diagram illustrating a substantially conjugate relationship of a first diffraction element and a second diffraction element according to an eleventh modified example.
Figure 26:
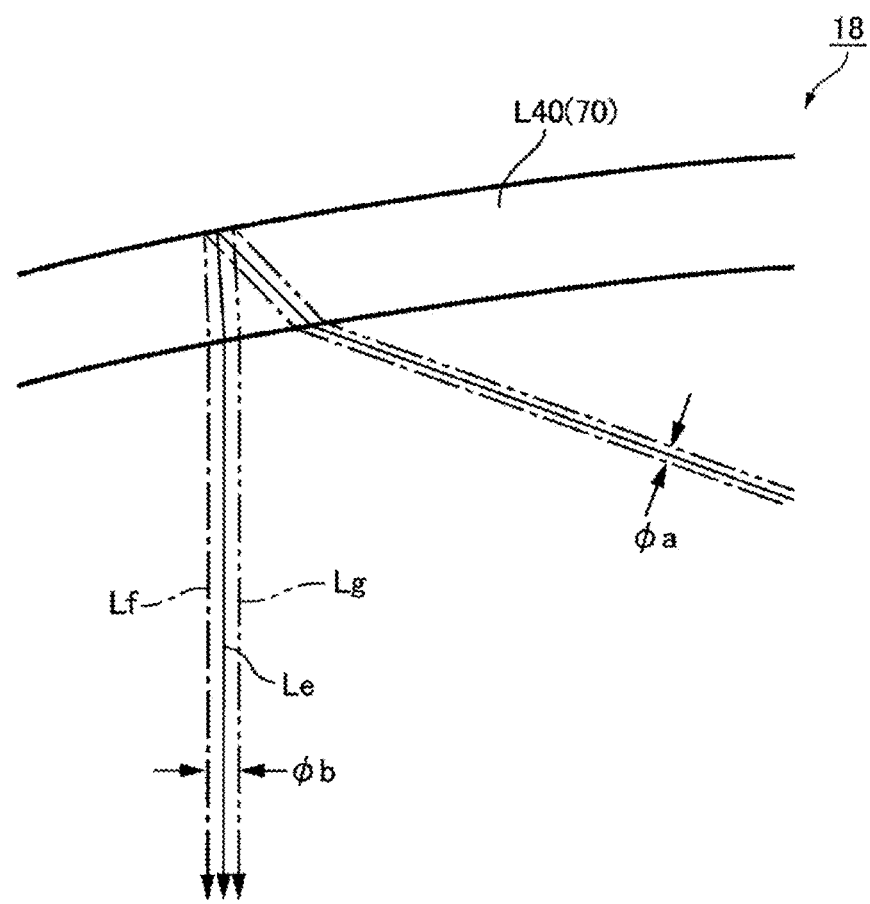
FIG. 26 is an explanatory diagram of the light emitted from the second diffraction element when being in the substantially conjugate relationship illustrated in FIG. 25.
Figure 27:
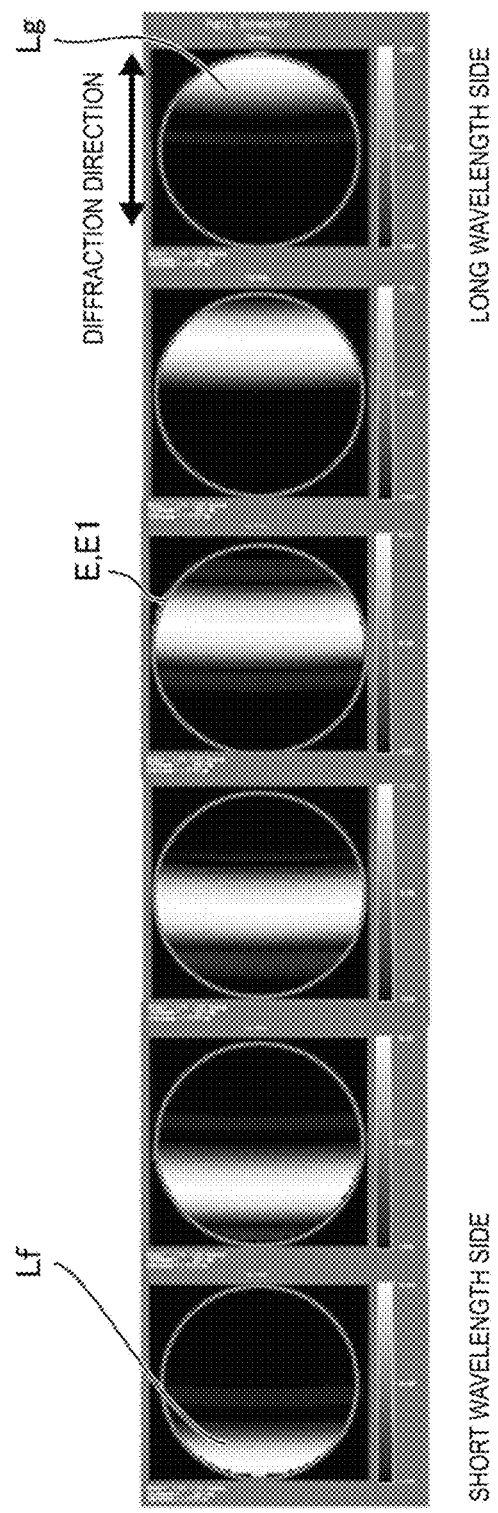
FIG. 27 is an explanatory diagram illustrating a state in which the light illustrated in FIG. 26 is incident on the eye.

FIG. 25 is an explanatory diagram illustrating a substantially conjugate relationship between the first diffraction optical element group 50 and the second diffraction optical element group 70 in an optical system 18 according to this modified example. FIG. 26 is an explanatory diagram of light emitted from the second diffraction optical element group 70, in the substantially conjugate relationship illustrated in FIG. 25. FIG. 27 is a set of explanatory pictures showing states in which the light illustrated in FIG. 26 enters the eye E. Note that, in FIG. 21, a solid line Le represents light in a specific wavelength. A one-dot-one-dash line Lf represents light in a wavelength that is 10 nm shorter than the specific wavelength. A two-dot-one-dash line Lg represents light in a wavelength that is 10 nm longer than the specific wavelength. In FIG. 27, the leftmost picture of the figure shows a state in which the light in a wavelength that is 10 nm shorter than the specific wavelength (the light represented by the one-dot-one-dash line Lf in FIG. 26) enters the eye E. The rightmost picture of the figure shows a state in which the light in a wavelength that is 10 nm longer than the specific wavelength (the light represented by the two-dot-one-dash line Lg in FIG. 26) enters the eye E. Pictures between the leftmost and rightmost pictures show states in which light in various wavelengths, from a wavelength that is 10 nm shorter than the specific wavelength to a wavelength that is 10 nm longer than the specific wavelength, enters the eye E. Note that, in FIG. 27, a state in which light in the specific wavelength enters the eye E is not shown. A state in which light in the specific wavelength enters the eye E shall be a state in between a state shown in the third picture from the left and a state shown in the fourth picture from the left.

In the exemplary embodiments and the modified examples described above, for example, it is preferred that the first diffraction optical element group 50 and the second diffraction optical element group 70 have a conjugate relationship. In this modified example, however, as described above, the first diffraction optical element group 50 and the second diffraction optical element group 70 have a substantially conjugate relationship. In this case, as illustrated in FIG. 25, light in a peripheral wavelength shifted from a specific wavelength enters the second diffraction optical element group 70 in different states. Here, in the second diffraction optical element group 70, as closer to an optical axis, the number of interference patterns is further reduced, and power of bending light is lower. Therefore, when light in a longer wavelength is caused to enter a side close to an optical axis and light in a shorter wavelength is caused to enter a side close to an end, light in a specific wavelength and light in a peripheral wavelength are collimated. Consequently, an effect similar to wavelength compensation can be achieved.

In this case, positions of rays of light are different depending on a wavelength. Therefore, as illustrated in FIG. 26, a diameter of rays of light to enter a pupil is increased to a diameter φb from a diameter φa. FIG. 27 shows states of intensity of rays of light entering a pupil in such a case. As can be understood from FIG. 27, a pupil cannot be satisfied near a specific wavelength. However, light in a peripheral wavelength enters a position shifted from the light in the specific wavelength, and thus a pupil diameter can be satisfied. As a result, an observer has an advantage in that the observer can more easily see an image, for example.

In the optical systems in the exemplary embodiments and the modified examples described above, an example of a case of including the projection optical system 32 is given. However, other members, such as the image light generating device, the first diffraction optical element group, and the second diffraction optical element group may have the functionality of the projection optical system 32.

In the optical systems in the exemplary embodiments and the modified examples described above, an example of a case where the thickness of the first diffraction optical element and the third diffraction optical element located on the light incident side is smaller than the thickness of the second diffraction optical element and the fourth diffraction optical element, respectively. However, the present disclosure is not limited to such a case. For example, the thickness of the first diffraction optical element and the third diffraction optical element located on the light incident side may be larger than the thickness of the second diffraction optical element and the fourth diffraction optical element, respectively. The thickness of the first diffraction optical element and the third diffraction optical element may be equal to the thickness of the second diffraction optical element and the fourth diffraction optical element, respectively.

Application to Other Display Device

In the exemplary embodiments and the modified examples described above, a head-mounted display device 100 is exemplified. However, the present disclosure may be applied to a head-up display, a hand-held display, and an optical system for a projector, for example.

What is claimed is:

1. A display device for guiding image light emitted from an image light generating device to a pupil of an observer, the display device comprising:
    a first diffraction optical element group having positive power and configured to receive the image light; and
    a second diffraction optical element group having positive power and configured to diffract the image light diffracted by the first diffraction optical element group to form an exit pupil, wherein
    the first diffraction optical element group is constituted by laminating a first diffraction optical element having a first interference pattern corresponding to a wavelength band of one or two of three colors of red, green, and blue of the image light, and a second diffraction optical element having a second interference pattern corresponding to a wavelength band of remaining colors of the three colors and
    the second diffraction optical element group is constituted by laminating a third diffraction optical element having a third interference pattern corresponding to a wavelength band of one or two of three colors of red, green, and blue of the image light, and a fourth diffraction optical element having a fourth interference pattern corresponding to a wavelength band of remaining colors of the three colors.

2. The display device according to claim 1, wherein
    the first diffraction optical element is located closer to an incident surface side of the image light than the second diffraction optical element in the first diffraction optical element group,
    the third diffraction optical element is located closer to an incident surface side of the image light than the fourth diffraction optical element in the second diffraction optical element group, and the first interference pattern and the third interference pattern correspond to at least a green wavelength band.

3. The display device according to claim 1, wherein
the first diffraction optical element is located closer to an incident surface side of the image light than the second diffraction optical element in the first diffraction optical element group,
the third diffraction optical element is located closer to an incident surface side of the image light than the fourth diffraction optical element in the second diffraction optical element group, and
the first interference pattern and the third interference pattern at least correspond to a blue wavelength band.

4. The display device according to claim 1, wherein
the first diffraction optical element is located closer to an incident surface side of the image light than the second diffraction optical element in the first diffraction optical element group,
the third diffraction optical element is located closer to an incident surface side of the image light than the fourth diffraction optical element in the second diffraction optical element group, and
the first interference pattern and the third interference pattern at least correspond to a wavelength band of the image light having a lowest transmittance in the first diffraction optical element and the third diffraction optical element.

5. The display device according to claim 1, wherein
the first diffraction optical element is located closer to an incident surface side of the image light than the second diffraction optical element in the first diffraction optical element group,
the third diffraction optical element is located closer to an incident surface side of the image light than the fourth diffraction optical element in the second diffraction optical element group, and
the first interference pattern and the third interference pattern at least correspond to a wavelength band of the image light having a lowest optical intensity.

6. The display device according to claim 1, wherein
the first diffraction optical element is located closer to an incident surface side of the image light than the second diffraction optical element in the first diffraction optical element group,
the third diffraction optical element is located closer to an incident surface side of the image light than the fourth diffraction optical element in the second diffraction optical element group, and
the first interference pattern and the third interference pattern at least correspond to a wavelength band of the image light that most affects a white balance in the image light.

7. The display device according to claim 1, wherein
the first diffraction optical element is located closer to an incident surface side of the image light than the second diffraction optical element in the first diffraction optical element group,
the third diffraction optical element is located closer to an incident surface side of the image light than the fourth diffraction optical element in the second diffraction optical element group,
a thickness of the first diffraction optical element is thinner than a thickness of the second diffraction optical element, and
a thickness of the third diffraction optical element is thinner than a thickness of the fourth diffraction optical element.

8. The display device according to claim 1, wherein
the first diffraction optical element, the second diffraction optical element, the third diffraction optical element, and the fourth diffraction optical element include a reflection-type volume hologram.

9. The display device according to claim 1, wherein
the first diffraction optical element group and the second diffraction optical element group have a curved shape.

* * * * *